United States Patent
Grabowska et al.

(10) Patent No.: US 10,408,228 B2
(45) Date of Patent: Sep. 10, 2019

(54) MIXED-FLOW TURBOCHARGER WITH VARIABLE TURBINE GEOMETRY

(71) Applicant: BorgWarner Inc., Auburn Hills, MI (US)

(72) Inventors: David G. Grabowska, Asheville, NC (US); Jaroslaw Kierat, Frankenthal (DE); Olgierd Urbanczyk, Czestochowa (PL); Andrzej Mazurek, Potok Gorny (PL)

(73) Assignee: BorgWarner Inc., Auburn Hills, MI (US)

( * ) Notice: Subject to any disclaimer, the term of this patent is extended or adjusted under 35 U.S.C. 154(b) by 654 days.

(21) Appl. No.: 14/374,393

(22) PCT Filed: Jan. 28, 2013

(86) PCT No.: PCT/US2013/023389
§ 371 (c)(1),
(2) Date: Jul. 24, 2014

(87) PCT Pub. No.: WO2013/116136
PCT Pub. Date: Aug. 8, 2013

(65) Prior Publication Data
US 2015/0016968 A1 Jan. 15, 2015

Related U.S. Application Data

(60) Provisional application No. 61/594,031, filed on Feb. 2, 2012.

(30) Foreign Application Priority Data

Feb. 6, 2012 (DE) .................. 10 2012 002 278

(51) Int. Cl.
*F04D 29/56* (2006.01)
*F02B 37/22* (2006.01)
(Continued)

(52) U.S. Cl.
CPC ......... *F04D 29/563* (2013.01); *F01D 17/165* (2013.01); *F02B 37/22* (2013.01);
(Continued)

(58) Field of Classification Search
CPC ........ F01D 9/045; F01D 9/048; F01D 17/165; F04D 13/043; F04D 27/002; F04D 27/0246; F04D 29/444; F04D 29/462
(Continued)

(56) References Cited

U.S. PATENT DOCUMENTS 3,186,685 A * 6/1965 Desbaillets ............. F01D 9/026
415/163
4,003,675 A * 1/1977 Stevens .................. F01D 17/162
415/150
(Continued)

FOREIGN PATENT DOCUMENTS

CN 102182546 A 9/2011
JP 57131802 A * 8/1982 ............. F01D 9/045
(Continued)

OTHER PUBLICATIONS

Machine translation of JP 2000-120442, accessed Jul. 2, 2018.*
(Continued)

*Primary Examiner* — Jason D Shanske
*Assistant Examiner* — Julian B Getachew
(74) *Attorney, Agent, or Firm* — Eric L. Doyle; Stephan A. Pendorf; Patent Central LLC

(57) ABSTRACT

A turbocharger (10) including variable turbine geometry has a turbine wheel (24) with a turbine axis of rotation (R1) that extends in an axial direction. The turbocharger (10) also has a plurality of guide vanes (34) that is selectively movable between a range of angular positions. Each one of the guide vanes (34) is supported for pivotal movement about a guide vane axis of rotation (R2) and each guide vane axis of
(Continued)

rotation (R2) is non-parallel to the turbine axis of rotation (R1).

10 Claims, 15 Drawing Sheets

(51) Int. Cl.
  *F02B 37/24* (2006.01)
  *F01D 17/16* (2006.01)
(52) U.S. Cl.
  CPC .......... *F02B 37/24* (2013.01); *F05D 2220/40* (2013.01); *F05D 2250/314* (2013.01); *Y02T 10/144* (2013.01)
(58) Field of Classification Search
  USPC ...................................................... 415/211.2
  See application file for complete search history.

(56) References Cited

U.S. PATENT DOCUMENTS

| | | | | |
|---|---|---|---|---|
| 4,141,672 A | * | 2/1979 | Wieland | F01D 1/023 415/1 |
| 6,699,010 B2 | * | 3/2004 | Jinnai | F01D 17/16 29/889.22 |
| 6,824,355 B2 | * | 11/2004 | Behrendt | F01D 17/162 415/160 |
| 7,463,969 B2 | * | 12/2008 | Yamaguchi | F02B 37/12 60/602 |
| 7,670,107 B2 | * | 3/2010 | Barthelet | F01D 17/165 29/889.2 |
| 7,771,162 B2 | * | 8/2010 | Castan | F01D 5/141 415/164 |
| 2004/0213665 A1 | | 10/2004 | Ohishi et al. | |
| 2010/0014961 A1 | | 1/2010 | Boening et al. | |
| 2010/0098529 A1 | | 4/2010 | Roby et al. | |
| 2010/0278651 A1 | * | 11/2010 | Jarusel | F01D 17/162 416/204 A |
| 2011/0138805 A1 | * | 6/2011 | Barthelet | F01D 17/165 60/602 |
| 2014/0161595 A1 | * | 6/2014 | Tashiro | F02B 37/24 415/146 |

FOREIGN PATENT DOCUMENTS

| | | |
|---|---|---|
| JP | 10274048 | 10/1998 |
| JP | 19980289489 | 10/1998 |
| JP | 2000064849 | 2/2000 |
| KR | 20040028753 A | 4/2004 |
| KR | 20090010199 A | 1/2009 |
| WO | 2006061588 | 6/2006 |

OTHER PUBLICATIONS

Chinese Office Action (with English language translation) dated Jul. 11, 2016, in Chinese Application No. 201380005526.2.
Korean Office Action (with English language translation) dated Nov. 2, 2018, in Korean Application No. 10-2014-7023117.

* cited by examiner

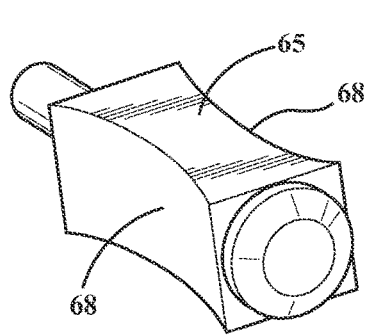 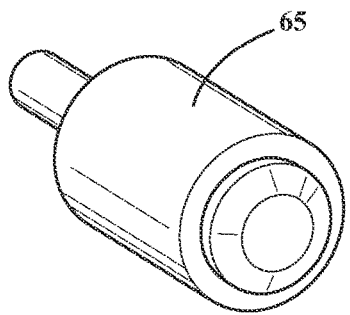
FIG. 3A  FIG. 3B
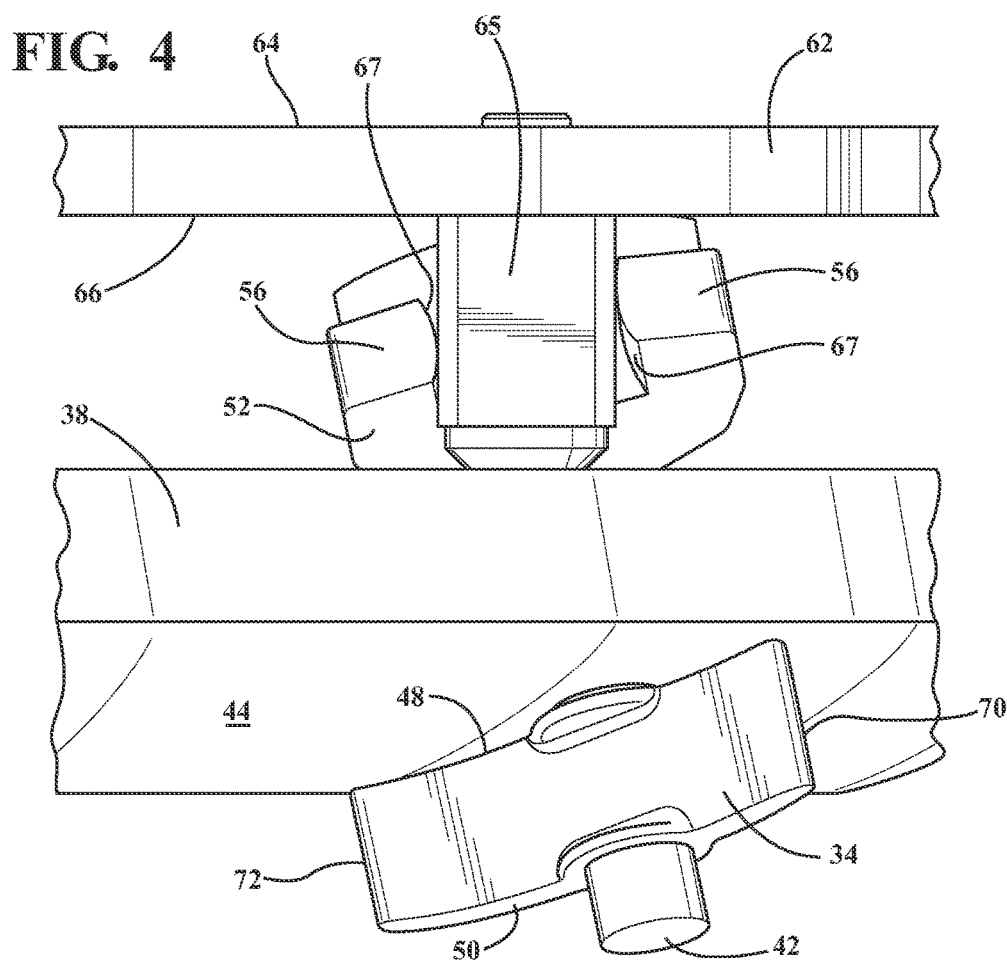
FIG. 4

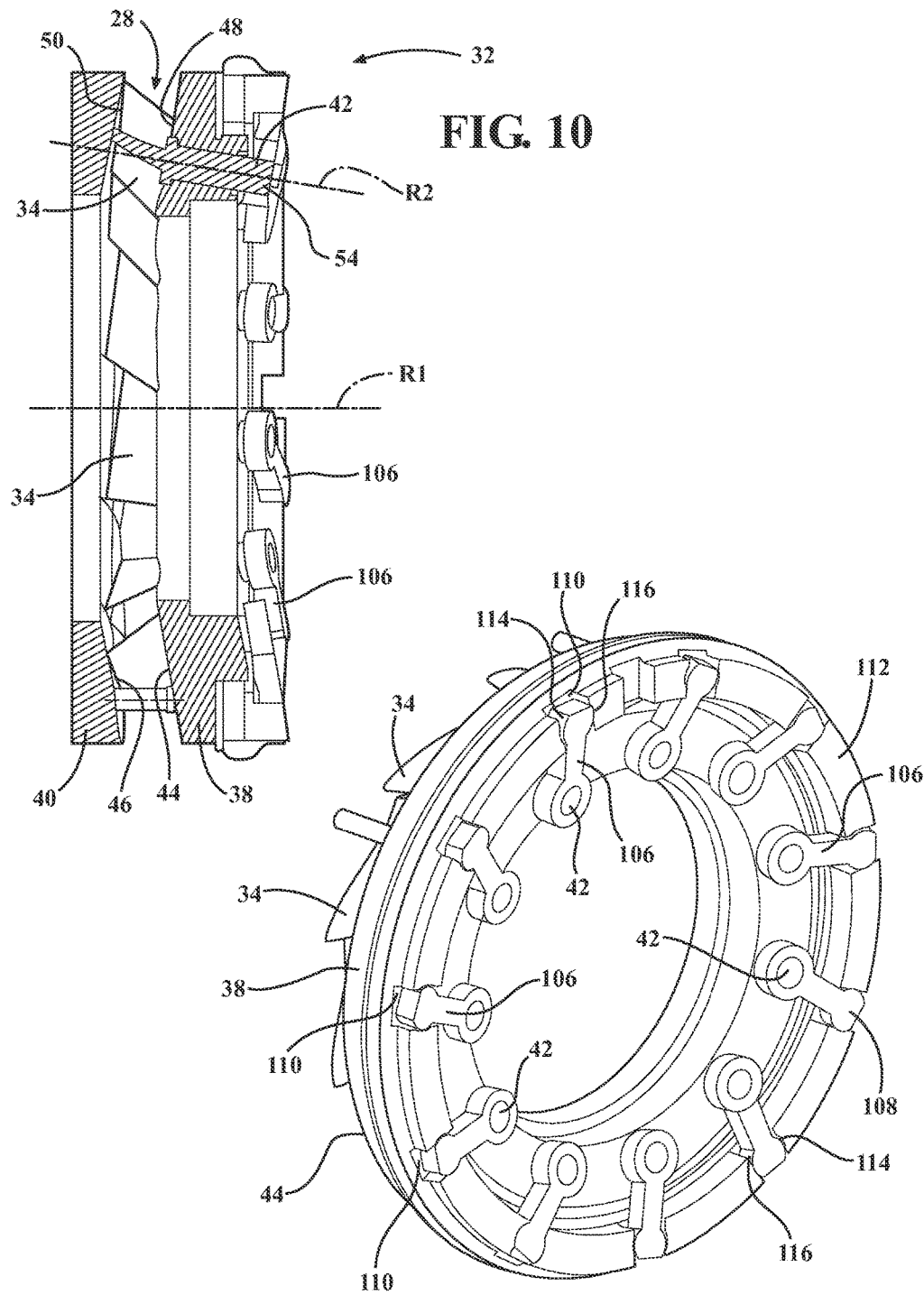

MIXED-FLOW TURBOCHARGER WITH VARIABLE TURBINE GEOMETRY

CROSS-REFERENCE TO RELATED APPLICATIONS

This application claims priority to and all the benefits of U.S. Provisional Application No. 61/594,031, filed on Feb. 2, 2012, and entitled "Mixed-Flow Turbocharger With Variable Turbine Geometry" and German Application No. 102012002278.6, filed on Feb. 6, 2012, and entitled "Exhaust Gas Turbocharger."

BACKGROUND OF THE INVENTION

Field of the Invention

This invention relates to a turbocharger for an internal combustion engine. More particularly, this invention relates to a mixed-flow turbocharger with variable turbine geometry.

Description of Related Art

A turbocharger is a type of forced induction system used with internal combustion engines. Turbochargers deliver compressed air to an engine intake, allowing more fuel to be combusted, thus boosting an engine's power density without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of reduced emissions.

Turbochargers include a turbine housing connected to the engine's exhaust manifold, a compressor housing connected to the engine's intake manifold, and a bearing housing connecting the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density, and air pressure delivered to the engine's cylinders via the engine's intake manifold.

The flow of exhaust gas to the turbine wheel, which drives rotation of the turbine wheel, can be generally characterized as either radial-flow or mixed-flow. In a radial-flow turbocharger, the exhaust gas is directed to the turbine wheel through a wheel inlet of the turbine housing in a radial direction relative to the axis of rotation. In other words, the flow of exhaust gas through the wheel inlet to the turbine wheel in radial-flow turbochargers is perpendicular to the axis of rotation of the turbine wheel. In contrast, in a mixed-flow turbocharger, the exhaust gas is directed to the turbine wheel through the wheel inlet of the turbine housing in a direction that includes both radial and axial components relative to the axis of rotation. In other words, the flow of exhaust gas through the wheel inlet to the turbine wheel in mixed-flow turbochargers is non-perpendicular to the axis of rotation of the turbine wheel.

To improve efficiency, responsiveness, or the operating range of the turbocharger, it is often advantageous to regulate the exhaust gas flowing to the turbine wheel. One method of regulating the exhaust gas flowing to the turbine wheel is commonly referred to by several names, including Variable Turbine Geometry (VTG), Variable Geometry Turbine (VGT), Variable Nozzle Turbine (VNT), or simply Variable Geometry (VG). VTG turbochargers include a plurality of adjustable guide vanes positioned within the wheel inlet leading to the turbine wheel and pivotally supported between upper and lower vane rings. The space between adjacent guide vanes constitutes flow channels for the exhaust gas flowing to the turbine wheel and the geometry of the flow channels is adjustable by adjusting the guide vanes within a pre-determined range of angular positions between an open position and a closed position. In the open position, the guide vanes extend generally radially relative to the axis of rotation to allow the exhaust gas to flow through the wheel inlet to the turbine wheel. In the closed position, the guide vanes extend generally tangentially relative to the axis of rotation to block the exhaust gas from flowing through the wheel inlet to the turbine wheel. In order to provide a high boost pressure at low engine speeds, the guide vanes are adjusted to constrict the flow channels between adjacent guide vanes. This results in the exhaust gas moving through the flow channels at a high speed. The increased kinetic energy of the exhaust gas is transferred to the turbine wheel, increasing the boost pressure. At high engine speeds, the guide vanes are adjusted to open up the flow channels between adjacent guide vanes. This results in the exhaust gas impacting the turbine wheel at a lower speed, thus decreasing the boost pressure.

In radial-flow turbochargers, each guide vane pivots about a shaft axis that is parallel to the axis of rotation of the turbine wheel. Therefore, clearance between the guide vanes and the upper and lower vane rings remains consistent as the guide vanes pivot between the open and closed positions. In addition, a control ring having an axis of rotation that is parallel to the shaft axis of each guide vane includes actuator blocks that are secured to the control ring and are operatively coupled with a vane fork of each guide vane to actuate the guide vanes between the open and closed positions in response to rotation of the control ring. It is appreciated that the vane forks pivot in a plane that is parallel to the plane of rotation of the control ring such that there is sliding contact between the vane forks and actuator blocks during adjustment of the guide vanes.

It is well known in the field of turbochargers that mixed-flow turbochargers overcome several inherent limitations of radial-flow turbochargers and therefore provide a better utilization of the engine's exhaust gas energy. However, incorporating guide vanes into mixed-flow turbochargers presents several problems. First, the wheel inlet is oriented to direct the flow of exhaust gas to the turbine wheel in a non-perpendicular direction relative to the axis of rotation of the turbine wheel. As such, sides of the upper and lower vane rings facing the wheel inlet define conical surfaces extending around the axis of rotation of the turbine wheel. In other words, the wheel inlet is a conical frustum shape. Therefore, clearance between the guide vanes and the upper and lower vane rings is not consistent as the guide vanes pivot between the open and closed positions. More specifically, in the open or generally radially extending position, clearances between the guide vanes and the upper and lower vane rings are uniform along the length of the guide vanes, from a leading edge to a trailing edge. In contrast, in the closed or generally tangentially extending position, the conical surface of the upper vane ring curves away from the leading and trailing edges of the guide vanes. As such, there is increased clearance between the upper vane ring and the leading and trailing edges of the guide vanes, which reduces the performance and efficiency of the turbocharger. Also in the closed position, the conical surface of the lower vane ring curves toward the leading and trailing edges of the guide vanes. As such, there is decreased clearance between the lower vane ring and the leading and trailing edges of the guide vanes, which must be accounted for to prevent binding of the guide vanes.

Second, each guide vane pivots bout a shaft axis that is non-parallel to the axis of rotation of the turbine wheel. In other words, the shaft axis of each guide vane is arranged at an acute angle in an inclined manner with respect to the axis of rotation of the turbine wheel. Therefore, the shaft axis of each guide vane is non-parallel to the axis of rotation of the control ring. Consequently, the vane forks pivot in planes that are non-parallel to the plane of rotation of the control ring such that there is rolling contact between the vane forks and the actuator blocks during adjustment of the guide vanes. As such, a typical vane fork and actuator block arrangement that is used in radial-flow turbochargers will bind if used in mixed-flow turbochargers.

It is desirable, therefore, to provide a mixed-flow turbocharger with adjustable guide vanes wherein clearances between the guide vanes and upper and lower vane rings remain consistent during adjustment of the guide vanes between open and closed positions.

SUMMARY OF THE INVENTION

According to one aspect of the invention, a turbocharger includes a guide apparatus that regulates exhaust gas flowing through a wheel inlet to a turbine wheel having a turbine axis of rotation. The guide apparatus includes a plurality of guide vanes selectively movable between a range of angular positions. Each one of the guide vanes pivots about a guide vane axis of rotation that is non-parallel to the turbine axis of rotation.

According to another aspect of the invention, upper and lower inlet walls of the wheel inlet define complimentary spherical surfaces having coincident spherical centers. The guide vane axis of rotation of each one of the guide vanes extends through the coincident spherical centers of the upper and lower inlet walls.

According to yet another aspect of the invention, upper and lower inlet walls of the wheel inlet include planar sections that define parallel boundary walls for each one of the guide vanes as the guide vanes pivot between the range of angular positions.

BRIEF DESCRIPTION OF THE DRAWINGS

Advantages of the present invention will be readily appreciated as the same becomes better understood by reference to the following detailed description when considered in connection with the accompanying drawings wherein:

FIG. 3A is a perspective view of a first alternative actuator block for use with the control ring in FIG. 3;

FIG. 3B is a perspective view of a second alternative actuator block for use with the control ring in FIG. 3;

FIG. 4 is a partially cut-away perspective view of the guide apparatus including the control ring illustrating one guide vane in an open position;

FIG. 10 is a cross-section side view of an alternative embodiment of the guide apparatus;

FIG. 11 is a perspective view of the guide apparatus of FIG. 10;

DETAILED DESCRIPTION OF THE EMBODIMENTS

Figure 1:
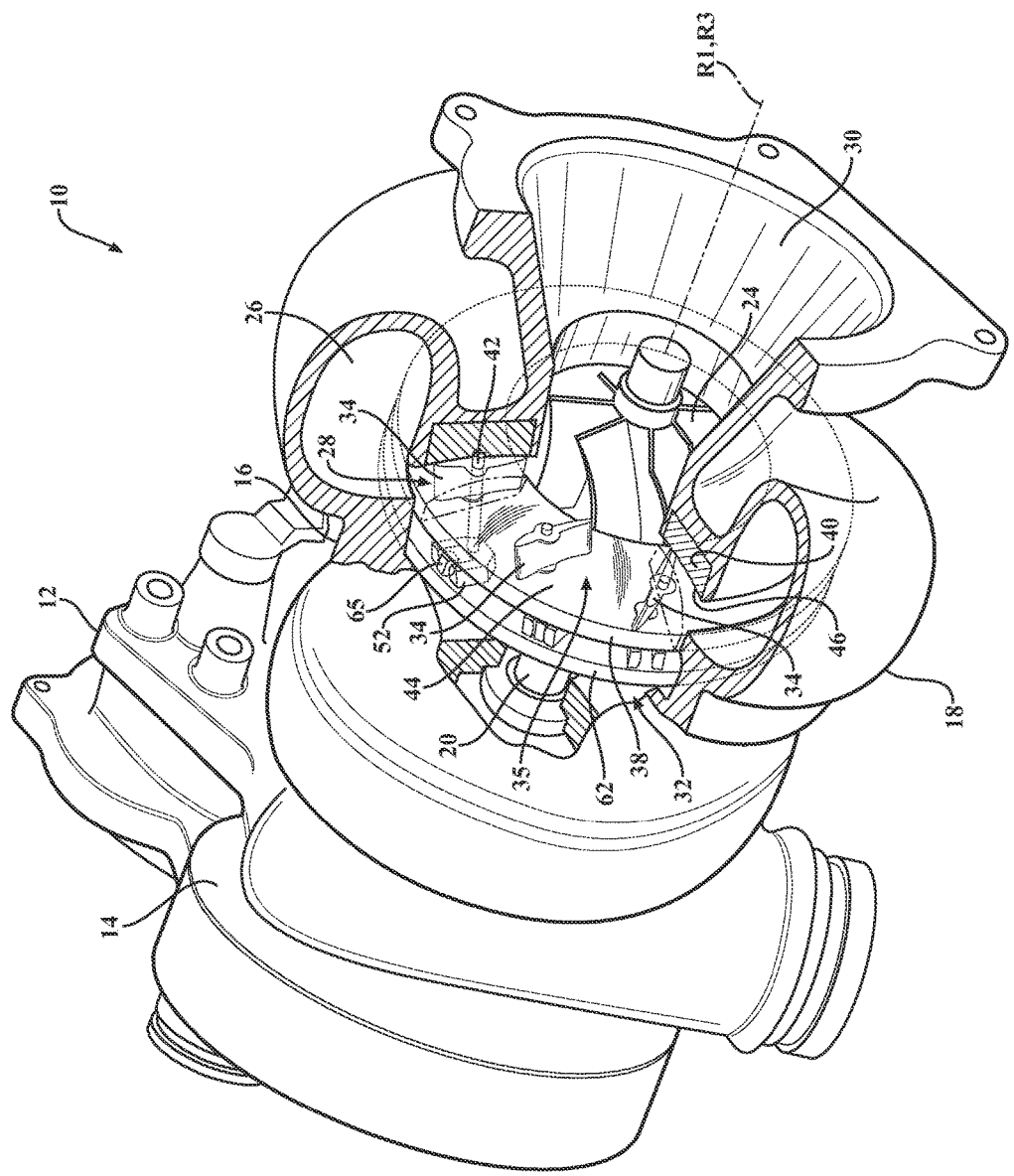
FIG. 1 is a partially-sectioned perspective view of a mixed-flow turbocharger with variable turbine geometry according to one embodiment of the invention.
Figure 2:
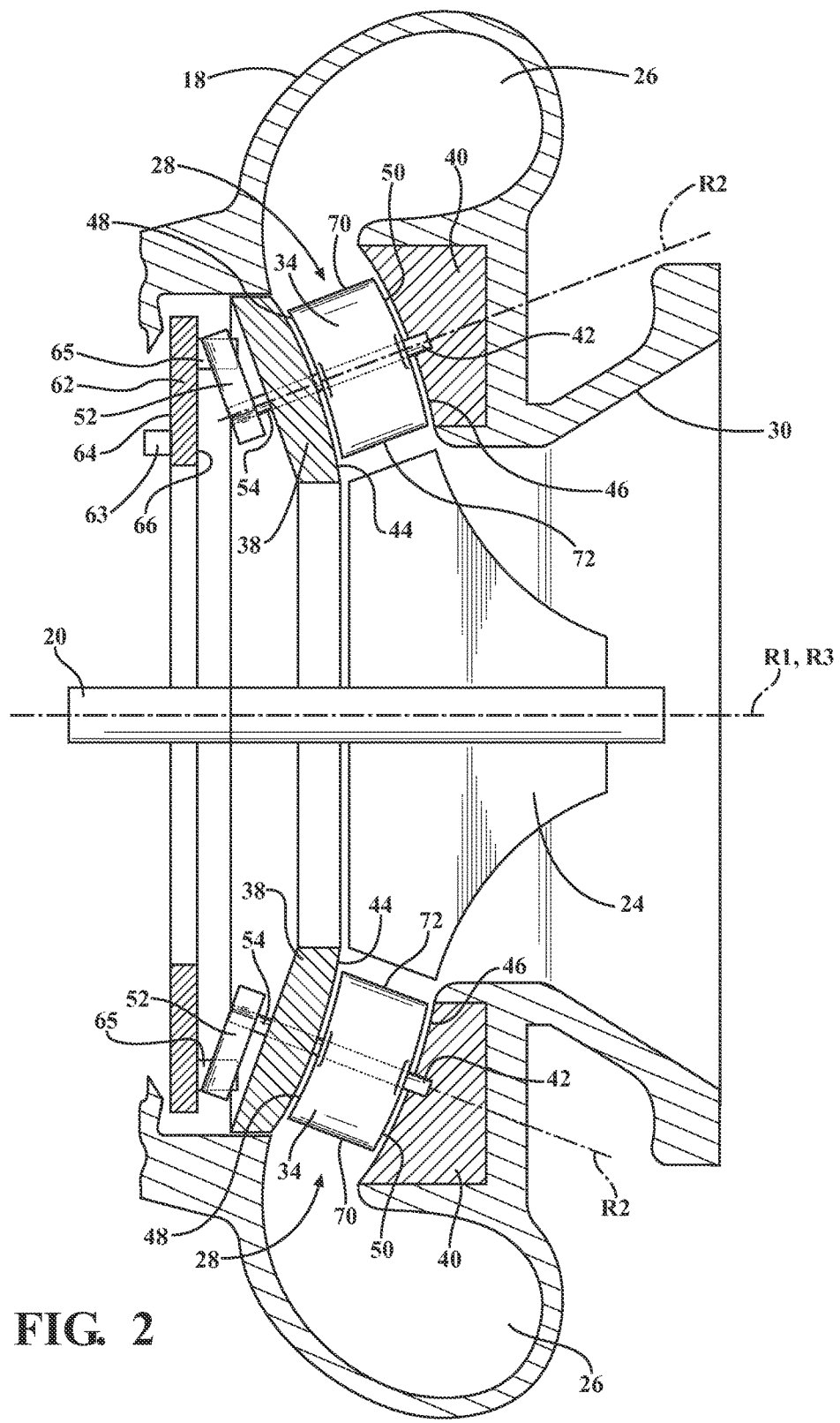
FIG. 2 is a cross-sectional side view of the mixed-flow turbocharger in FIG. 1.

Referring to the Figures, a turbocharger is illustrated generally at 10 in FIG. 1. The turbocharger 10 includes a housing assembly 12 consisting of a compressor housing 14, a bearing or center housing 16, and a turbine housing 18 that are connected to each other. The bearing housing 16 supports a rotatable shaft 20 that extends in an axial direction and defines a turbine axis of rotation R1. A compressor impellor (not shown) having a plurality of blades is mounted on one end of the shaft 20 and is housed within the compressor housing 14. A turbine wheel 24 having a plurality of blades is mounted on an opposite end of the shaft 20 and is housed within the turbine housing 18. The turbine housing 18 defines a volute 26 that is coupled to an exhaust manifold (not shown) and evolves into a wheel inlet 28 for directing a flow of exhaust gas from the exhaust manifold to the turbine wheel 24. As is well known in the art, the turbine wheel 24 is rotatably driven by the exhaust gas supplied from the exhaust manifold, which rotates the shaft 20, thereby causing the compressor impeller to rotate. In other words, the compressor impeller is rotatably driven by the turbine wheel 24. After driving the turbine wheel 24, the exhaust gas is discharged from the turbine housing 18 through a central exit pipe or exducer 30.

In the present embodiment of the invention, the turbocharger 10 is characterized as a mixed-flow turbocharger because the wheel inlet 28 in the turbine housing 18 is oriented such that the flow of exhaust gas is guided to impact a leading edge of the blades of the turbine wheel 24 in a direction that includes both radial and axial components. In other words, the flow of exhaust gas to the turbine wheel 24 is non-perpendicular to the turbine axis of rotation R1.

In order to maximize the performance and efficiency of the turbocharger 10, it is common to control or regulate the exhaust gas flowing to the turbine wheel 24. A guide apparatus 32 is provided for regulating the flow of exhaust gas to the turbine wheel 24. The guide apparatus 32 is positioned within the turbine housing 18 and includes a plurality of guide vanes 34 located within the wheel inlet 28 leading to the turbine wheel 24. The space between adjacent guide vanes 34 defines a flow channel or nozzle throat 35, best seen in FIG. 1, through which the exhaust gas flows to the turbine wheel 24. By varying an angular position of the guide vanes 34, the cross-section of the flow channels 35 are adjustable.

The guide vanes 34 are arranged circumferentially around the turbine axis of rotation R1. Each guide vane 34 is supported between an upper vane ring 38 and a lower vane ring 40 by a pivot shaft 42. The pivot shafts 42, with the guide vanes 34 fixedly secured thereto, rotate to provide pivotal movement of the guide vanes 34. Alternatively, the guide vanes 34 may be supported by the pivot shafts 42 between the upper vane ring 38 and a ring-shaped wall of the turbine housing 18, without varying from the scope of the invention. The upper vane ring 38 is securely mounted to the turbine housing 18 on one side of the wheel inlet 28, in a direction generally toward the bearing housing 16. The upper vane ring 38 includes an upper inlet wall 44 that constitutes one side of the wheel inlet 28. The upper vane ring 38 is a ring-shaped section taken from an imaginary sphere such that the upper inlet wall 44 defines a convex spherical surface and, as such, has a spherical center corresponding thereto. The lower vane ring 40 is spaced apart from the upper vane ring 38, in a direction generally away from the bearing housing 16. The lower vane ring 40 includes a lower inlet wall 46 that constitutes another side of the wheel inlet 28. The lower vane ring 40 is also a ring-shaped section taken from the imaginary sphere such that the lower inlet wall 46 defines a concave spherical surface and, as such, has a spherical center corresponding thereto. The upper and lower inlet walls 44, 46 are complementary in that the spherical center of the upper inlet wall 44 is coincident with the spherical center of the lower inlet wall 46. It is contemplated that the upper inlet wall 44 may define the concave spherical surface and the lower inlet wall 46 the convex spherical surface, having coincident spherical centers, without varying from the scope of the invention.

Each pivot shaft 42 defines a guide vane axis of rotation R2 associated with the corresponding guide vane 34 that extends through the coincident spherical centers of the upper and lower inlet walls 44, 46 of the upper and lower vane rings 38, 40. Each guide vane axis of rotation R2 is arranged at an acute angle relative to the turbine axis of rotation R1. In other words, each guide vane axis of rotation R2 is non-parallel to the turbine axis of rotation R1. In addition, each guide vane 34 includes upper and lower edges 48, 50 that are shaped complimentary to the upper and lower inlet walls 44, 46, respectively. More specifically, the upper edge 48 of each guide vane 34 has a concave spherical surface that is shaped complimentary to the convex spherical surface of the upper inlet wall 44. Similarly, the lower edge 50 of each guide vane 34 has a convex spherical surface that is shaped complimentary to the concave spherical surface of the lower inlet wall 46. The pivot shafts 42 extend from the upper edge 48 of the guide vanes 34 and penetrate through corresponding bores of the upper vane ring 38. A vane lever or vane fork 52 is fixedly secured to a distal end 54 of each pivot shaft 42 away from the guide vane 34. The vane fork 52 extends generally perpendicular to the pivot shaft 42 and includes two spaced apart guide arms 56 with a recess therebetween. The pivot shafts 42 also extend from the lower edge 50 of the guide vanes 34 and are inserted into corresponding bores of the lower vane ring 40.

Figure 3:
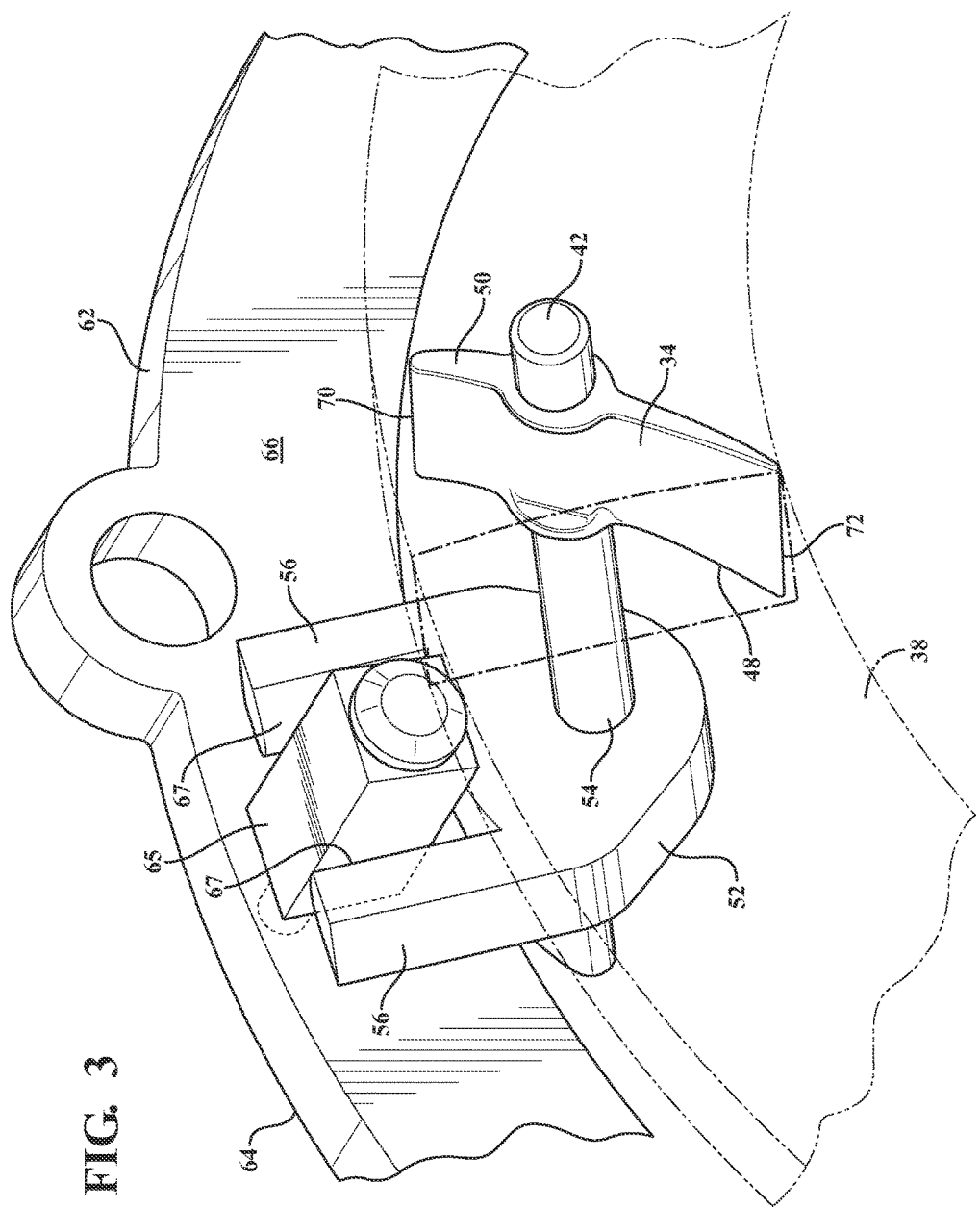
FIG. 3 is a partially cut-away perspective view of a guide apparatus including a control ring with an actuator block for actuating a guide vane.

In order to control the angular position of the guide vanes 34, an actuation device (not shown) is provided outside the housing assembly 12, which controls an actuation movement of a pestle member (not shown) that extends into the housing assembly 12, as is commonly known to one skilled in the art. The actuation movement of the pestle member is transferred to a control or adjusting ring 62, which is positioned adjacent to the upper vane ring 38. More specifically, the pestle member is operatively coupled to an actuator lug 63 that is fixedly secured to a first face 64 of the control ring 62 facing the bearing housing 16. The actuation movement of the pestle member is thereby converted into rotational movement of the control ring 62. The control ring 62 defines a control ring axis of rotation R3 that is coaxial with the turbine axis of rotation R1. Rotational movement of the control ring 62 about the control ring axis of rotation R3 in opposite first and second directions enables adjustment of the guide vanes 34 between an open or generally radially extending position and a closed or generally tangentially extending position. In the open position, the guide vanes 34 extend generally radially relative to the turbine axis of rotation R1 to allow the exhaust gas to flow through the wheel inlet 28 to the turbine wheel 24. In contrast, in the closed position, the guide vanes 34 extend generally tangentially relative to the turbine axis of rotation R1 to block the exhaust gas from flowing through the wheel inlet 28 to the turbine wheel 24. In FIG. 1, the guide vanes 34 are shown in the open position. The guide vanes 34 are adjustable through a range of angular positions between the open position and the closed position depending on the desired flow of exhaust gas to the turbine wheel 24. In FIG. 3, one of the guide vanes 34 is shown in an angular position between the open and closed positions.

Figure 5:
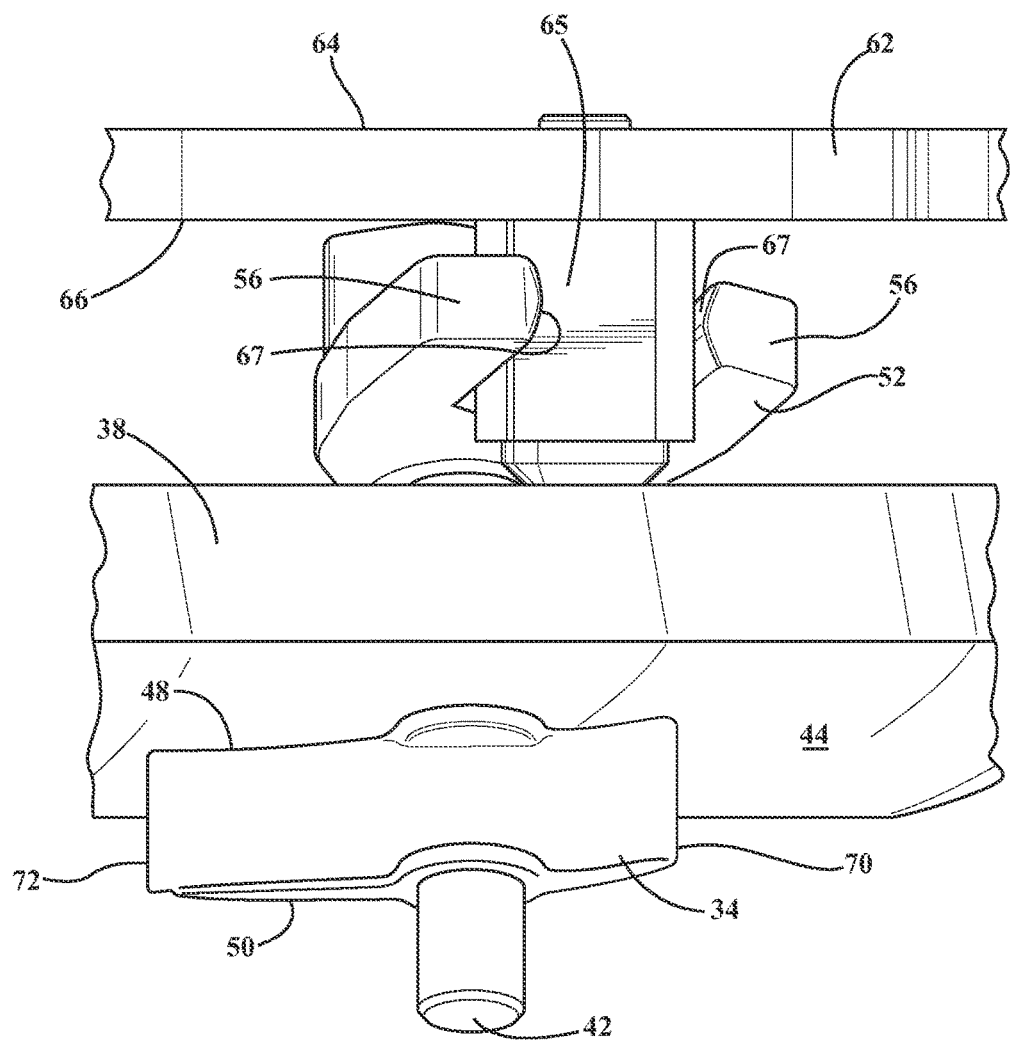
FIG. 5 is a partially cut-away perspective view of the guide apparatus including the control ring illustrating one guide vane in a closed position.

The control ring 62 is operatively coupled to the vane fork 52 of each guide vane 34 for synchronous actuation of the guide vanes 34 between the open and closed positions in response to rotational movement of the control ring 62 relative to the upper and lower vane rings 38, 40. A plurality of actuator blocks 65 is rotatably secured to a second face 66 of the control ring 62 facing the upper vane ring 38. Each actuator block 65 extends in the axial direction, generally parallel to the axes of rotation R1 and R3, and corresponds with one of the guide vanes 34. More specifically, each actuator block 65 is positioned in the recess between the guide arms 56 of the vane fork 52 of the corresponding guide vane 34, as shown in FIGS. 3, 4 and 5. In the present embodiment, since the vane forks 52 pivot in planes that are non-parallel to the second face 66 of the control ring 62, a means of engagement between the vane forks 52 and the actuator blocks 65 is modified as compared with a means of engagement that is typically used in radial-flow turbochargers wherein vane forks pivot in a plane that is parallel to a control ring. For example, it is well known that vane forks in radial-flow turbochargers typically have guide arms with a flat inner surface for sliding contact with actuator blocks on a control ring. In contrast, an inner surface 67 of each guide arm 56 in the present invention has a convex curved surface for rolling contact with the corresponding actuator block 65 as the guide vanes 34 are adjusted between the open and closed positions. When the guide vanes 34 are adjusted between the open and closed positions, the inner surface 67 of one guide arm 56 on the vane fork 52 rolls along the corresponding actuator block 65 such that the guide arm 56 moves in the axial direction toward the control ring 62. At the same time, the inner surface 67 of the other guide arm 56 on the vane fork 52 rolls along the corresponding actuator block 65 such that the guide arm 56 moves in the axial direction away from the control ring 62. Referring to FIG. 4, the orientation between one vane fork 52 and the corresponding actuator block 65 is shown when the guide vanes 34 are in the open position. In contrast, referring to FIG. 5, the orientation between one vane fork 52 and the corresponding actuator block 65 is shown when the guide vanes 34 are in the closed position.

It is contemplated that the actuator blocks 65 may have a rectangular shape, as shown in FIG. 3, wherein there is a line of contact between the inner surface 67 of each guide arm 56 and the corresponding actuator block 65. To ensure rolling contact between the inner surfaces 67 and the actuator blocks 65, a radius of curvature of the inner surfaces 67 is selected such that the line of contact between the inner surfaces 67 and the actuator blocks 65 is a tangent to the inner surfaces 67 when the guide vanes 34 are in the open and closed positions. It is also contemplated that the actuator blocks 65 may have a cylindrical shape, as shown in FIG. 3B, wherein there is a point of contact between the inner surface 67 of each guide arm 56 and the corresponding actuator block 65. It is further contemplated that the cylindrical or rectangular-shaped actuator blocks 65 may have curved sides 68 or an "hour glass" shape to match the radius of curvature of the inner surfaces 67 of the guide arms 56, as shown in FIG. 3A, thereby increasing the contact area between the vane forks 52 and the actuator blocks 65. Other complex shapes may be used for the inner surfaces 67 of the guide arms 56 and the actuator blocks 65 without varying from the scope of the invention.

With the guide vanes 34 in the open position, or some angular position between the open and closed positions, the guide vanes 34 are arranged to define the flow channels 35 between adjacent guide vanes 34, thereby regulating the exhaust gas flowing through the wheel inlet 28 to the turbine wheel 24. In contrast, with the guide vanes 34 in the closed position, the guide vanes 34 are arranged in an end-to-end overlapping fashion, thereby blocking or preventing the exhaust gas from flowing through the wheel inlet 28 to the turbine wheel 24. More specifically, the angular position of the guide vanes 34 in the closed position is such that a leading edge 70 of each guide vane 34 overlaps a trailing edge 72 of an adjacent guide vane 34, thereby closing the flow channels 35 and blocking the exhaust gas from flowing through the wheel inlet 28. In the embodiment shown, the leading and trailing edges 70, 72 of each guide vane 34 are approximately parallel to the corresponding guide vane axis of rotation R2. It is contemplated, however, that the leading and trailing edges 70, 72 of the guide vane 34 may be non-parallel to the guide vane axis of rotation R2 without varying from the scope of the invention.

It is typically desirable to have a certain amount of clearance between the upper edge 48 of the guide vanes 34 and the upper inlet wall 44, and similarly, between the lower edge 50 of the guide vanes 34 and the lower inlet wall 46 to permit free movement of the guide vanes 34 and to allow for thermal expansion due to the hot exhaust gas. However, irrespective of whether the guide vanes 34 are in the open position, the closed position, or some angular position between the open and closed positions, minimizing the clearance and having a consistent amount of clearance from the leading edge 70 to the trailing edge 72 of each guide vane 34 tends to improve the performance and efficiency of the turbocharger 10. For example, with the guide vanes 34 in the closed position, minimizing the clearance helps to prevent leakage of the exhaust gas around the upper and lower edges 48, 50 of the guide vanes 34. With the guide vanes 34 in the open position, or some angular position between the open and closed positions, minimizing the clearance helps to ensure that the exhaust gas is guided through the flow channels 35 between adjacent guide vanes 34 rather than leaking around the upper and lower edges 48, 50 of the guide vanes 34.

In the present embodiment of the invention, the amount of clearance between the guide vanes 34 and the upper and lower vane rings 38, 40 is consistent along the length of the guide vanes 34 between the leading and trailing edges 70, 72. Further, the clearance is unchanged as the guide vanes 34 are adjusted between the open and closed positions. More specifically, since the upper and lower edges 48, 50 of the guide vanes 34 are shaped complimentary to the upper and lower inlet walls 44, 46, respectively, and the axis of rotation R2 of each pivot shaft 42 extends through the coincident spherical centers of the upper and lower inlet walls 44, 46, the clearance between the guide vanes 34 and the upper and lower vane rings 38, 40 is consistent along the length of the guide vanes 34 and the clearance remains unchanged as the guide vanes 34 are adjusted between the open and closed positions.

Figure 6:
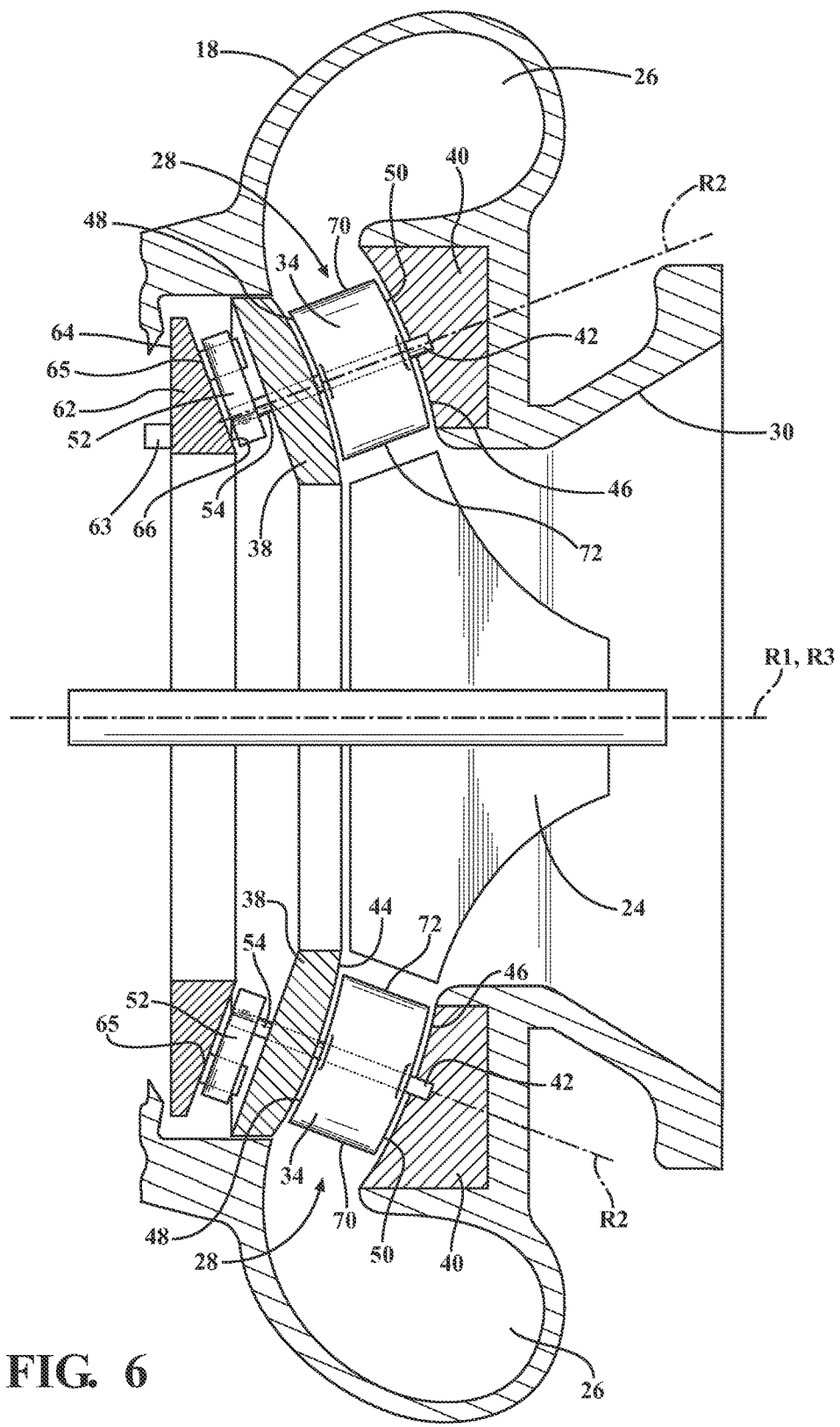
FIG. 6 is a cross-sectional side view of the mixed-flow turbocharger according to a second embodiment of the invention.

In a second embodiment of the invention shown in FIG. 6, the vane forks 52 and actuator blocks 65 are oriented to have sliding contact, as in radial-flow turbochargers, rather than rolling contact, as in the first embodiment described above. More specifically, the second face 66 of the control ring 62 facing the upper vane ring 38 defines a conical surface that is generally parallel to the vane forks 52. As such, the vane forks 52 pivot in planes that are generally parallel to the second face 66 of the control ring 62 and the vane forks 52 and actuator blocks 65 are oriented to have sliding contact, rather than rolling contact. Further, the first face 64 of the control ring 62 facing the bearing housing 16 is generally perpendicular to the axes of rotation R1 and R3 such that there will be sliding contact between the pestle member and the actuator lug 63 during rotational movement of the control ring 62 in the first and second directions.

Alternatively, it is appreciated that the second face 66 of the control ring 62 may remain generally parallel to the vane forks 52 and the first face 64 may be generally parallel with the second face 66 such that the first face 64 is non-perpendicular to the axes of rotation R1 and R3, thereby resulting in rolling contact between the pestle member and the actuator lug 63. In this instance, the pestle member will have inner surfaces with a convex curved surface for rolling contact with the actuator lug 63 similar to the description with respect to the vane forks 52 and actuator blocks 65 in the first embodiment. It is further appreciated that, in this instance, the actuator lug 63 may have a rectangular shape, a cylindrical shape, or curved sides, as disclosed above with respect to the actuator blocks 65.

Figure 7:
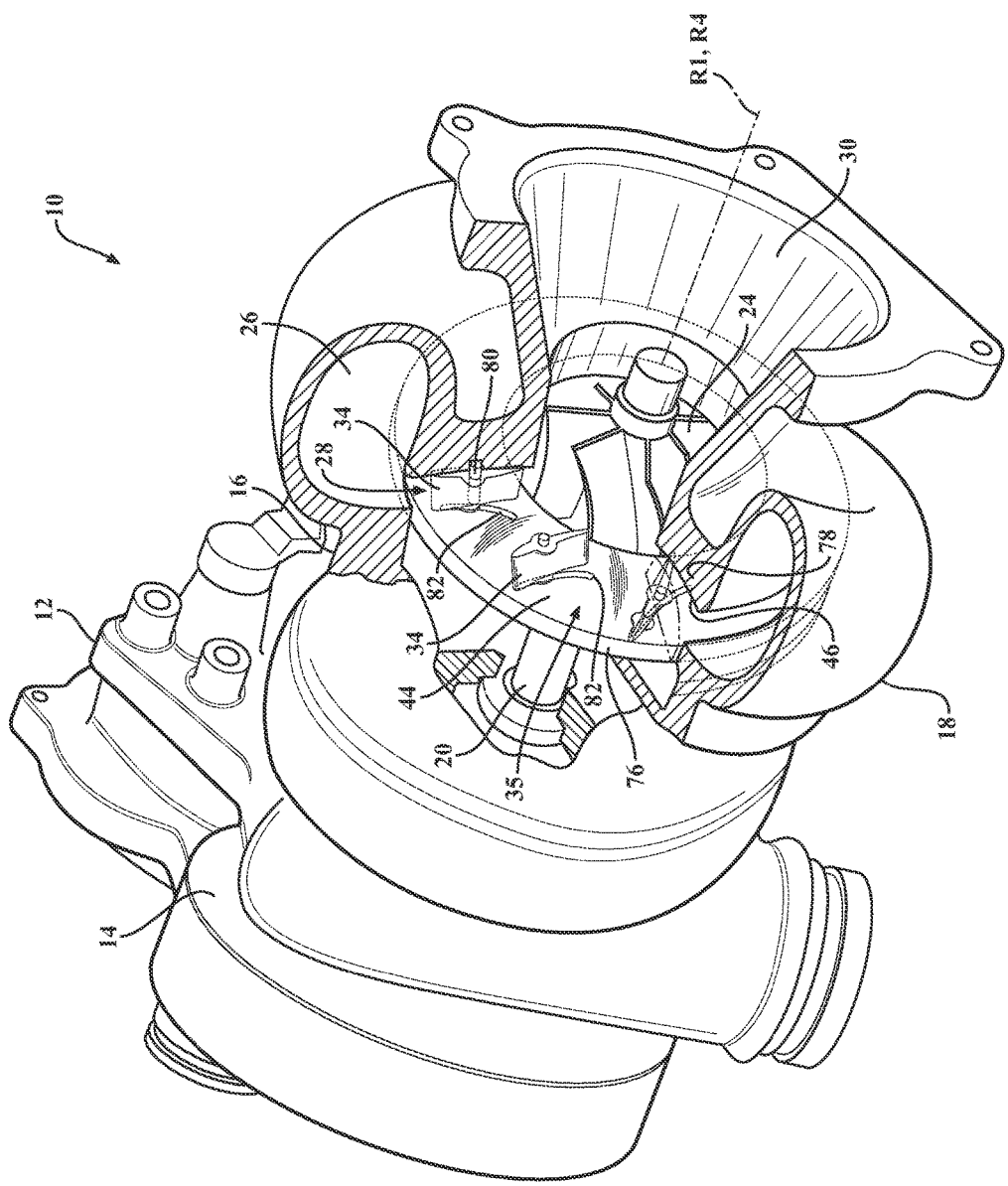
FIG. 7 is a partially-sectioned perspective view of a mixed-flow turbocharger with variable turbine geometry according to a third embodiment of the invention.
Figure 8:
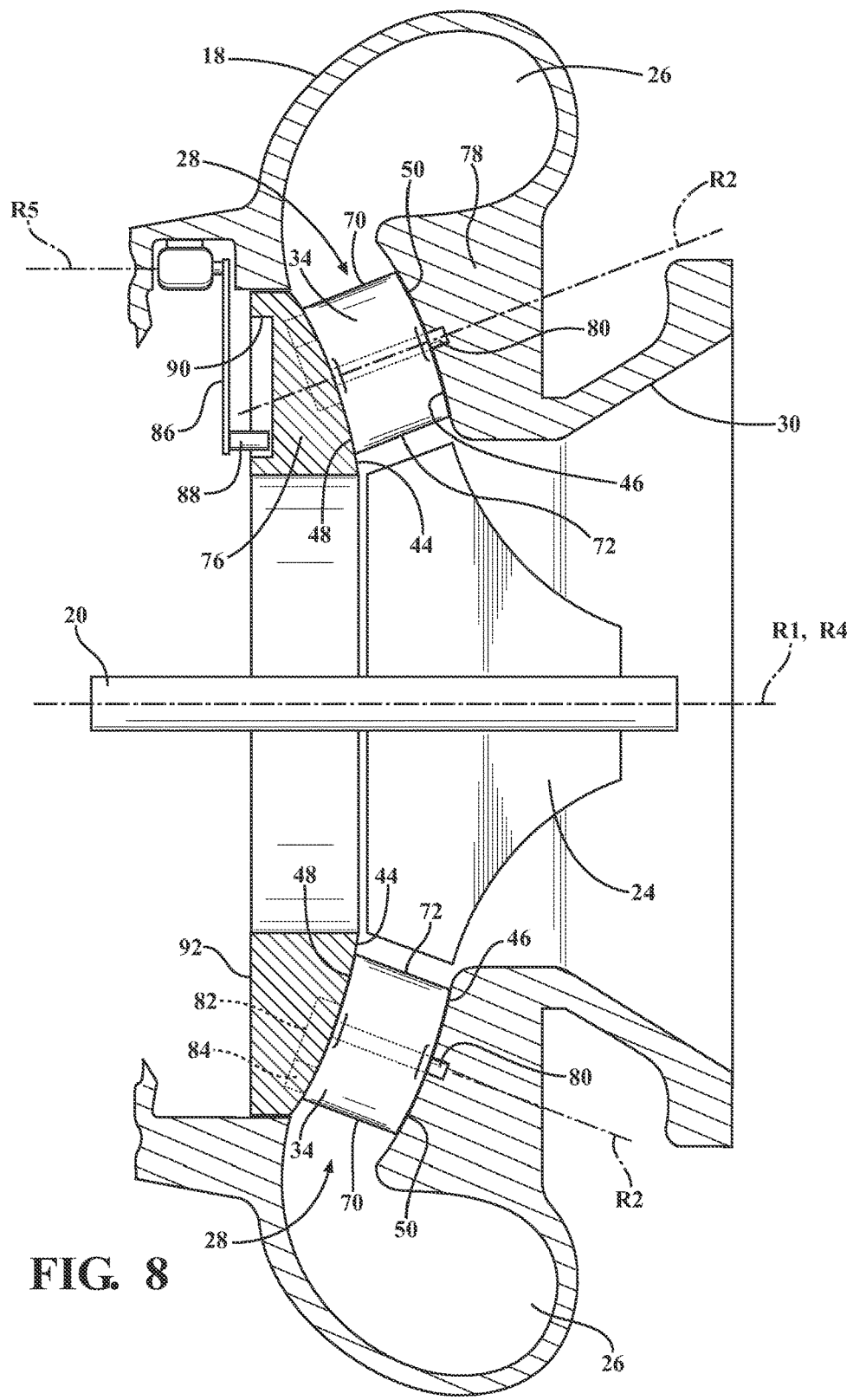
FIG. 8 is a cross-sectional side view of the mixed-flow turbocharger in FIG. 7.
Figure 9:
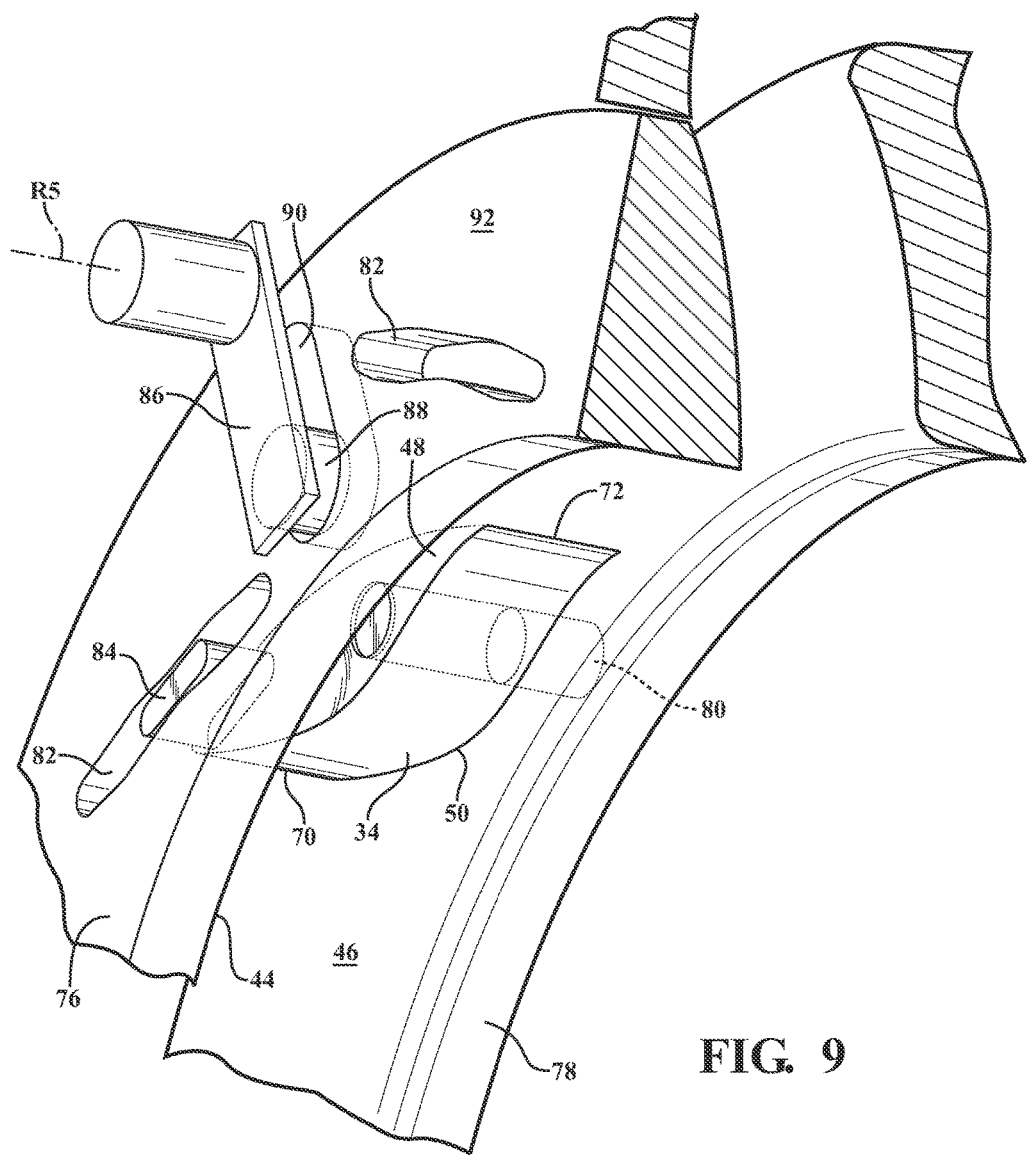
FIG. 9 is a partially cut-away perspective view of a guide apparatus including a vane actuating ring with a slot for actuating a guide vane.
Figure 12:
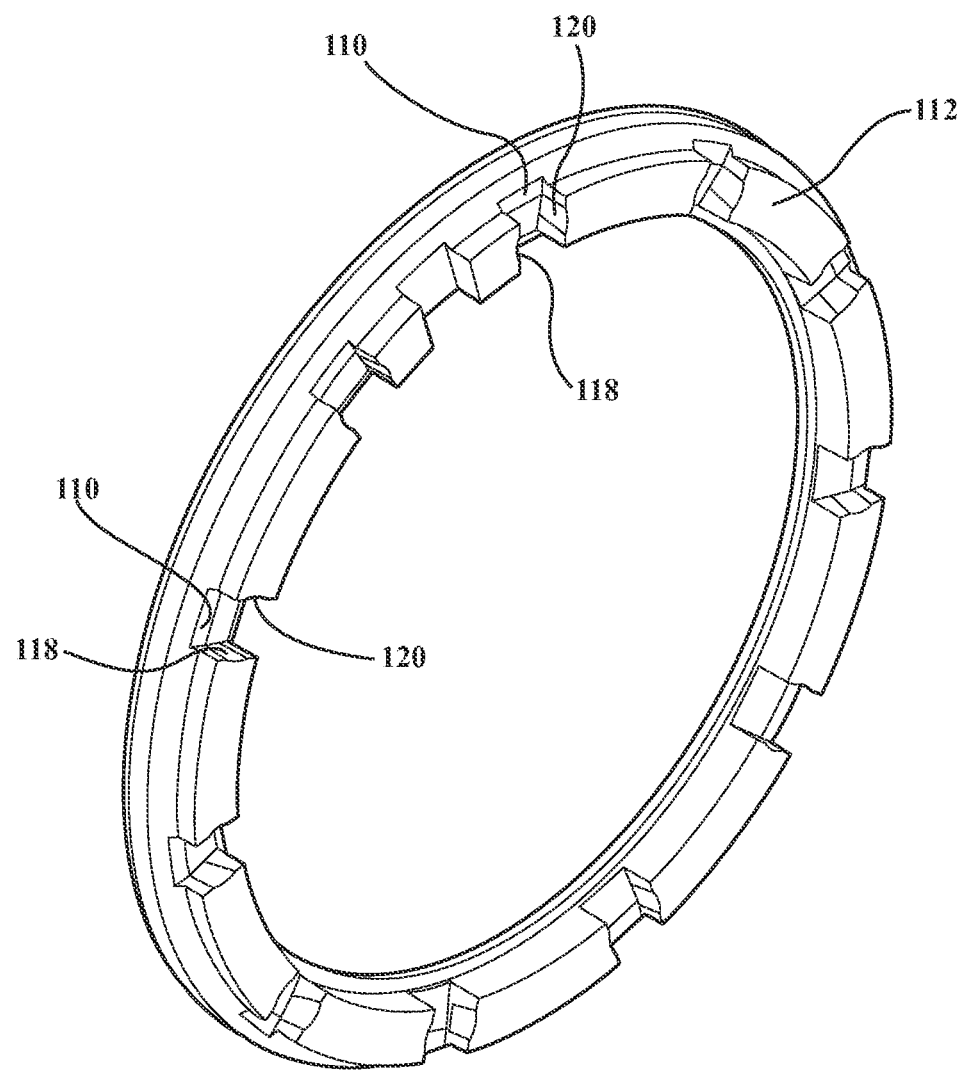
FIG. 12 is perspective view of the control ring of the guide apparatus of FIG. 10.

Referring to FIGS. 7 through 9, in a third embodiment of the invention the upper vane ring 38 and control ring 62 are generally combined to form a vane actuating ring 76. In addition, the lower vane ring 40 is eliminated. As such, each guide vane 34 is supported between the vane actuating ring 76 and a ring-shaped wall 78 of the turbine housing 18 by a pivot pin 80. The pivot pins 80 extend from the lower edge 50 of the guide vanes 34 and are inserted into a corresponding bore in the ring-shaped wall 78. The pivot pins 80, with the guide vanes 34 fixedly secured thereto, rotate to provide pivotal movement of the guide vanes 34 between the open and closed positions. Alternatively, the pivot pins 80 may be fixedly secured to the ring-shaped wall 78 and inserted into a corresponding bore in each guide vane 34. In this instance, the guide vanes 34 are rotatably secured to the pivot pins 80 and pivot about the pivot pins 80 between the open and closed positions.

The vane actuating ring 76 includes the upper inlet wall 44 defining the convex spherical surface that constitutes one side of the wheel inlet 28 and has the spherical center corresponding thereto. Similar to the lower vane ring 40, the ring-shaped wall 78 includes the lower inlet wall 46 defining the concave spherical surface that constitutes the other side of the wheel inlet 28 and has the spherical center corresponding thereto that is coincident with the spherical center of the upper inlet wall 44. Further, each pivot pin 80 defines the guide vane axis of rotation R2 for the corresponding guide vane 34 that extends through the coincident spherical centers of the upper and lower inlet walls 44, 46.

As in the first embodiment, the upper edge 48 of each guide vane 34 is formed having the concave spherical surface that is complimentary to the convex spherical surface of the upper inlet wall 44 and the lower edge 50 of each guide vane 34 is formed having the convex spherical surface that is complimentary to the concave spherical surface of the lower inlet wall 46. In the present embodiment, there is zero clearance between the upper edge 48 of the guide vanes 34 and the upper inlet wall 44 and the lower edge 50 of the guide vanes 34 and the lower inlet wall 46 such that there is sliding contact between the respective surfaces.

The guide vanes 34 are actuated between the open and closed positions in response to rotational movement of the vane actuating ring 76. The vane actuating ring 76 defines a vane actuating ring axis of rotation R4 that is coaxial with the turbine axis of rotation R1 and includes a plurality of slots 82 formed in the upper inlet wall 44. The slots 82 extend at an angle, i.e., radially and circumferentially, from an inner end generally adjacent an inner circumference of the vane actuating ring 76 to an outer end generally adjacent an outer circumference of the vane actuating ring 76. A tab 84 extends from the upper edge 48 of each guide vane 34 and is received in a corresponding one of the slots 82 in the upper inlet wall 44. Each tab 84 is aligned along a tab axis that extends through the coincident spherical centers of the upper and lower inlet walls 44, 46. Rotational movement of the vane actuating ring 76 about the vane actuating ring axis of rotation R4 in opposite first and second directions enables adjustment of the guide vanes 34 between the open and closed positions.

An actuation arm 86 is operatively coupled to the vane actuating ring 76 for rotating the vane actuating ring 76 in the first and second directions in response to pivotal movement of the actuation arm 86. The actuation device, provided outside the housing assembly 12, controls the pivotal movement of the actuation arm 86, as is commonly known to one skilled in the art. More specifically, the actuation arm 86 pivots about an actuation arm axis of rotation R5 that is generally parallel to the turbine axis of rotation R1 and includes an actuation post 88 that is disposed in an actuation slot 90 in the vane actuating ring 76. The actuation slot 90 extends in a radial direction relative to the axes of rotation R1 and R4. As the pivot arm 86 pivots about the pivot arm axis of rotation R5 in the first direction (clockwise direction when referring to FIG. 9), the actuation post 88 urges the vane actuating ring 76 to rotate in the second direction (counterclockwise direction when referring to FIG. 9), thereby causing the guide vanes 34 to pivot toward the closed position. More specifically, as the vane actuating ring 76 rotates in the second direction (counterclockwise direction when referring to FIG. 9), the tabs 84 slide inwardly within the slots 82, thereby causing the guide vanes 34 to pivot about the pivot pins 80 toward the closed position. Alternatively, as the pivot arm 86 pivots about the pivot arm axis of rotation R5 in the second direction (counterclockwise direction when referring to FIG. 9), the actuation post 88 urges the vane actuating ring 76 to rotate in the first direction (clockwise direction when referring to FIG. 9), thereby causing the guide vanes 34 to pivot toward the open position. More specifically, as the vane actuating ring 76 rotates in the first direction (clockwise direction when referring to FIG. 9), the tabs 84 slide outwardly within the slots 82, thereby causing the guide vanes 34 to pivot about the pivot pins 80 toward the open position.

In the embodiment shown in FIGS. 7 through 9, a first face 92 of the vane actuating ring 76 is generally perpendicular to the axes of rotation R1 and R4 such that there is sliding contact between the actuation post 88 and inner walls of the actuation slot 90 during rotational movement of the vane actuating ring 76 in the first and second directions. It is appreciated, however, that the first face 92 of the vane actuating ring 76 may be non-perpendicular to the axes of rotation R1 and R4, thereby resulting in rolling contact between the actuation post 88 and inner walls of the actuation slot 90. In this instance, the actuation slot 90 will have inner surfaces with a convex curved surface for rolling contact with the actuation post 88 similar to the description with respect to the vane forks 52 and actuator blocks 65 in the first embodiment. It is further appreciated that the actuation post 88 may have a rectangular shape, a cylindrical shape, or curved sides, as disclosed above with respect to the actuator blocks 65.

In a fourth embodiment of the invention, the guide apparatus 32 is incorporated into a turbocharger 10 that is characterized as an axial-flow turbocharger because the wheel inlet 28 is oriented such that the flow of exhaust gas is guided to impact a leading edge of the blades of the turbine wheel 24 in a generally axial direction. In other words, the flow of exhaust gas to the turbine wheel 24 is generally parallel to the turbine axis of rotation R1. It is appreciated that as the design of the turbine wheel 24 and wheel inlet 28 are configured such that the turbocharger is characterized as axial-flow rather than mixed-flow, there is less space available in the housing assembly 12 to incorporate components for adjusting the guide vanes 34 between the open and closed positions.

More specifically, in the mixed-flow turbocharger described above, the components for adjusting the guide vanes 34, namely, the vane forks 52, pestle member (not shown), control ring 62, actuator lug 63 and actuator blocks 65, are positioned in the axial direction between the guide vanes 34 and the bearing housing 16. Compared with the location of the guide vanes 34 of the mixed-flow turbocharger, the guide vanes 34 in the axial-flow turbocharger are located in the axial direction generally towards the bearing housing 16 and in the radial direction generally towards the shaft 20. As such, there is less space available between the guide vanes 34 and the bearing housing 16 to incorporate the components for adjusting the guide vanes 34. In fact, in certain instances, attempting to incorporate the components for adjusting the guide vanes 34 in the axial direction between the guide vanes 34 and the bearing housing 16 may cause interference with oil cavities within the bearing housing 16. It is therefore contemplated that in certain axial-flow turbochargers, the components for adjusting the guide vanes 34 will be positioned on a down-stream side of the turbine wheel 24. In other words, the components for adjusting the guide vanes 34 may be positioned generally towards the exducer 30.

Referring to FIGS. 10 through 20, in a fifth embodiment of the invention, the guide apparatus 32, also referred to as a variable turbine geometry cartridge or VTG cartridge, is configured such that the boundary walls of the wheel inlet 28, also referred to as a flow duct, are generally parallel to the upper and lower edges 48, 50 of the guide vanes 34 irrespective of the angular position of the guide vanes 34. As in the embodiments described above, each guide vane axis of rotation R2 is arranged at an acute angle relative to the turbine axis of rotation R1. This angle can be adapted to suit the particular application and can accordingly assume different values. In the case of the embodiment illustrated, the acute angle is approximately 10 degrees. However, in principle, values for the acute angle of up to approximately 45 degrees are advantageous.

Figure 13:
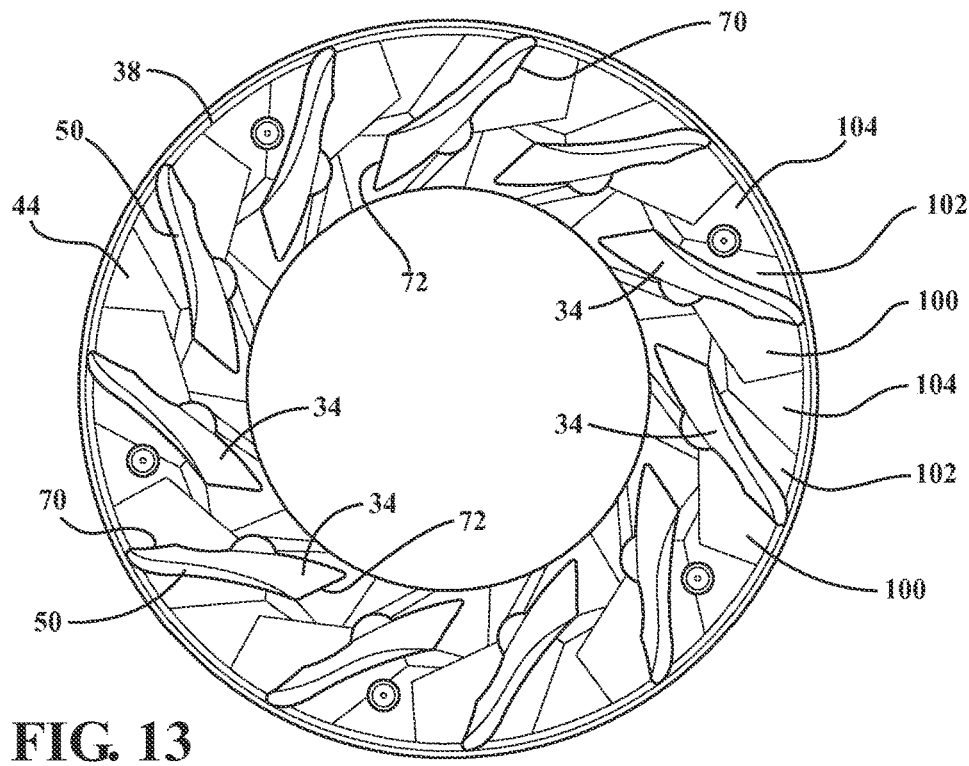
FIG. 13 is a plan view of the guide apparatus of FIG. 10 with the guide vanes shown in an open position.
Figure 14:
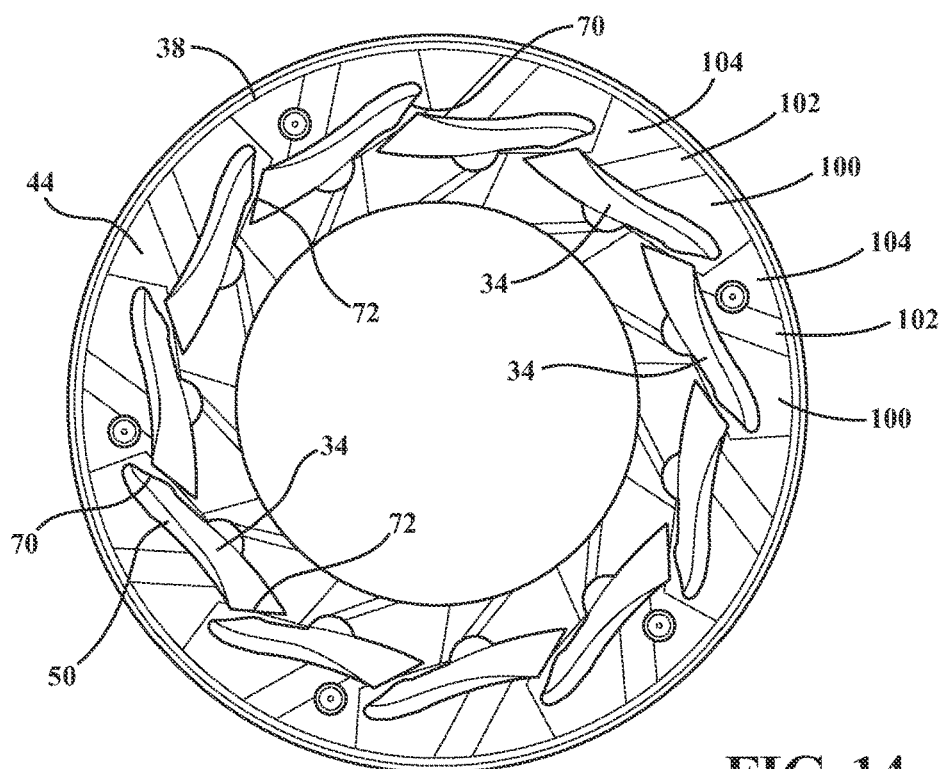
FIG. 14 is a plan view of the guide apparatus of FIG. 10 with the guide vanes shown in a closed position.

In contrast to the embodiments described above, the upper inlet wall 44 of the upper vane ring 38 does not define a convex spherical surface and the lower inlet wall 46 of the lower vane ring 40 does not define a concave spherical surface. In addition, the upper and lower edges 48, 50 of the guide vanes 34 do not define concave and convex spherical surfaces. Rather, the upper and lower inlet walls 44, 46 include a plurality of complimentary planar sections. With respect to each guide vane 34, the upper and lower inlet walls 44, 46 include a first planar section 100, a second planar section 102, and a third planar section 104 which are arranged adjacent to one another, as shown in FIGS. 13 and 14. That is, the first, second, and third planar sections 100, 102, 104 are sequentially arranged.

The first planar section 100 of the upper inlet wall 44 is generally parallel with the first planar section 100 of the lower inlet wall 46. The upper and lower edges 48, 50 of the guide vanes 34 have generally flat surfaces extending between the leading and trailing edges 70, 72 thereof. As such, the upper edge 48 of the guide vanes 34 is generally parallel with the first planar section 100 of the upper inlet wall 44 and the lower edge 50 of the guide vanes 34 is generally parallel with the first planar section 100 of the lower inlet wall 46 as the guide vanes 34 are adjusted between the open position, shown in FIG. 13, and the closed position, shown in FIG. 14. In other words, the cooperation between the first planar section 100 of the upper inlet wall 44 and the first planar section 100 of the lower inlet wall 46 results in the wheel inlet 28 having parallel boundary surfaces for the upper and lower edges 48, 50 of the guide vanes 34 irrespective of the angular position of the guide vanes 34.

The second planar section 102 relating to each guide vane 34 is a chamfer that eliminates a step between the first planar section 100 and the third planar section 104 in order to prevent a disturbance of the exhaust gas as it flows through the wheel inlet 28.

The third planar section 104 of each guide vane 34 is disposed between the corresponding second planar section 102 and the first planar section 100 of the adjacent guide vane 34.

It is appreciated that the first, second, and third planar sections 100, 102, 104 each have a different angle of inclination. It is further appreciated that the upper and lower inlet walls 44, 46 may have any number of planar sections without varying from the scope of the invention.

A lever 106 is fixedly secured to the distal end 54 of each pivot shaft 42 away from the guide vane 34. The lever 106 extends generally perpendicular to the pivot shaft 42 and includes a lever head 108. The lever head 108 is accommodated in an associated slot 110 in a control or adjusting ring 112.

Rotation of the control ring 112 causes the levers 106 to rotate or pivot, which results in rotation of the pivot shafts 42, thereby causing rotation or adjustment of the guide vanes 34 between the open and closed positions. A plane of rotation for the control ring 112 is generally perpendicular to the turbine axis of rotation R1. A plane of rotation for each lever 106 is disposed at an angle relative to the plane of rotation for the control ring 112. As such, rotation of the control ring 112 and the corresponding rotation of the levers 106 causes the lever heads 108 to move in the axial direction relative to the slots 110 in the control ring 112. In order to allow for such axial movement between the control ring 112 and the lever heads 108, not only are the slots 110 provided with an appropriate depth, but the lever heads 108 are provided with side surfaces 114, 116 to ensure there is a line of contact between the lever heads 108 and flanks 118, 120 of the slots 110 as the guide vanes 34 are adjusted between the open and closed positions.

Figure 15:
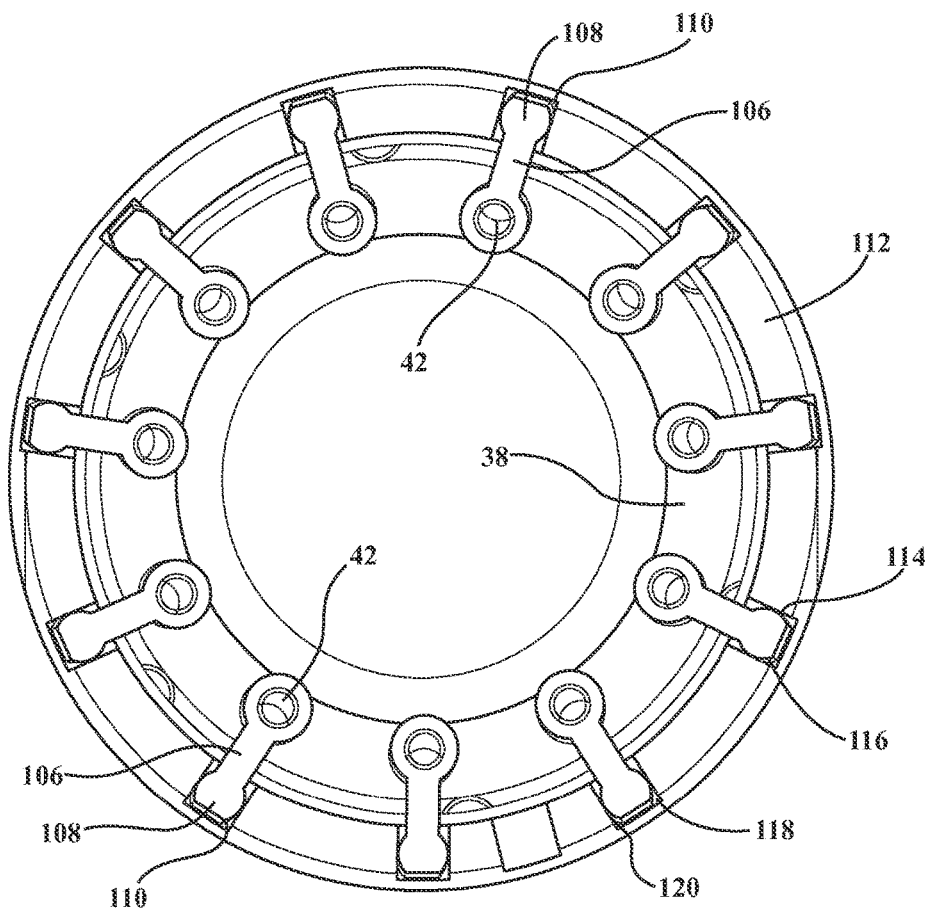
FIG. 15 is a plan view of the control ring of FIG. 10 in a starting position.
Figure 16:
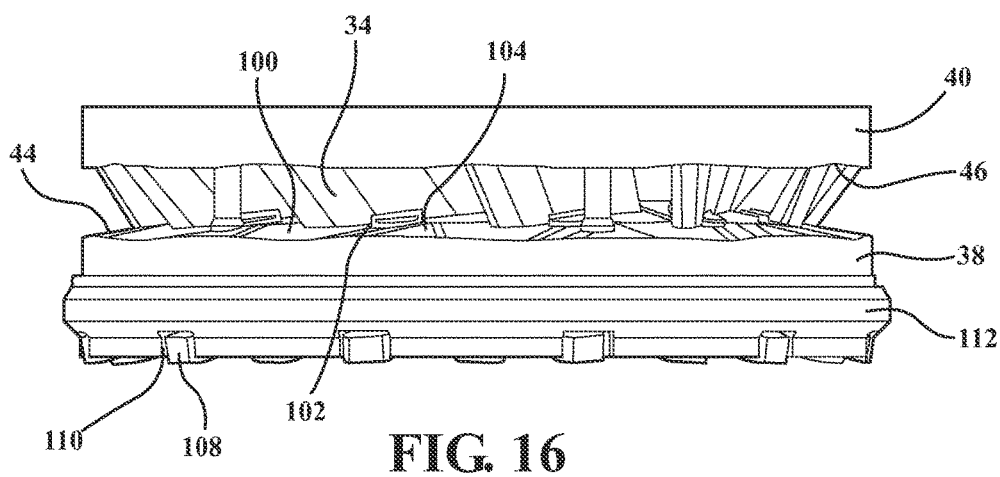
FIG. 16 is a side view of the guide apparatus and control ring in the starting position.
Figure 17:
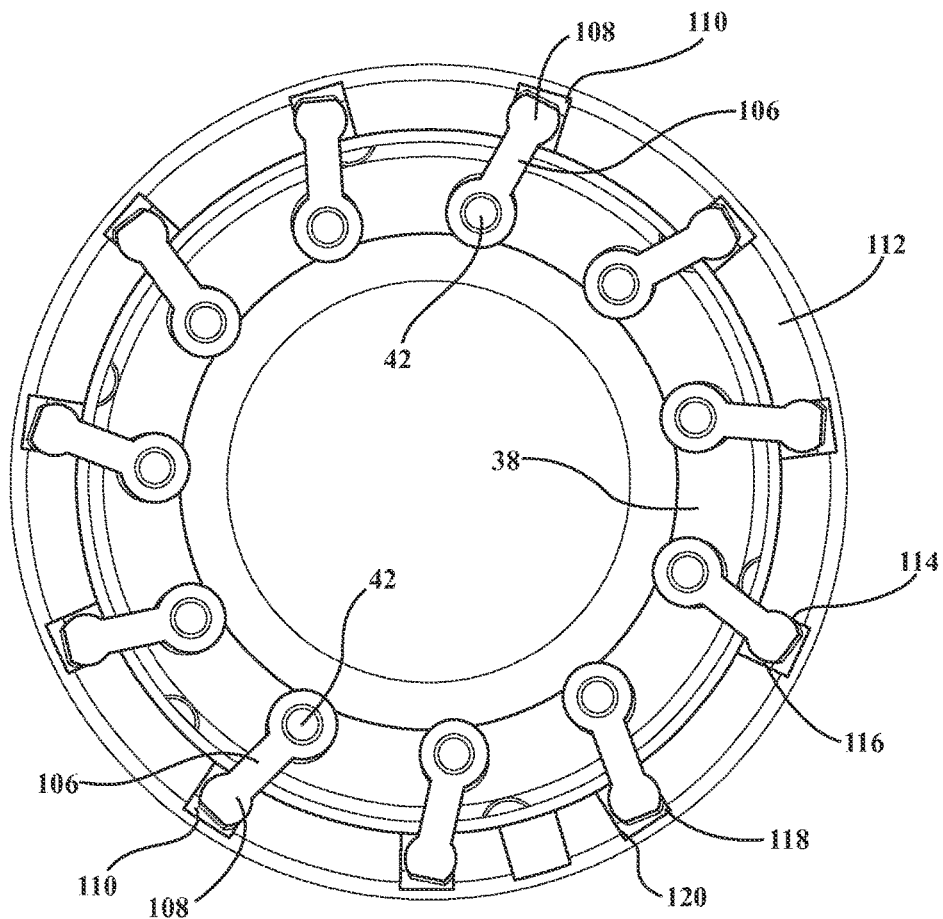
FIG. 17 is a plan view of the control ring rotated in a first direction.
Figure 18:
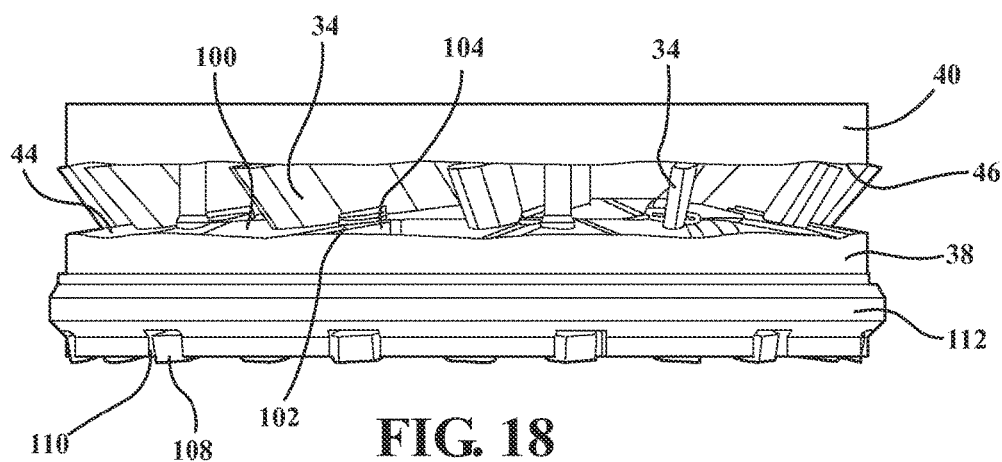
FIG. 18 is a side view of the guide apparatus and control ring rotated in the first direction.
Figure 19:
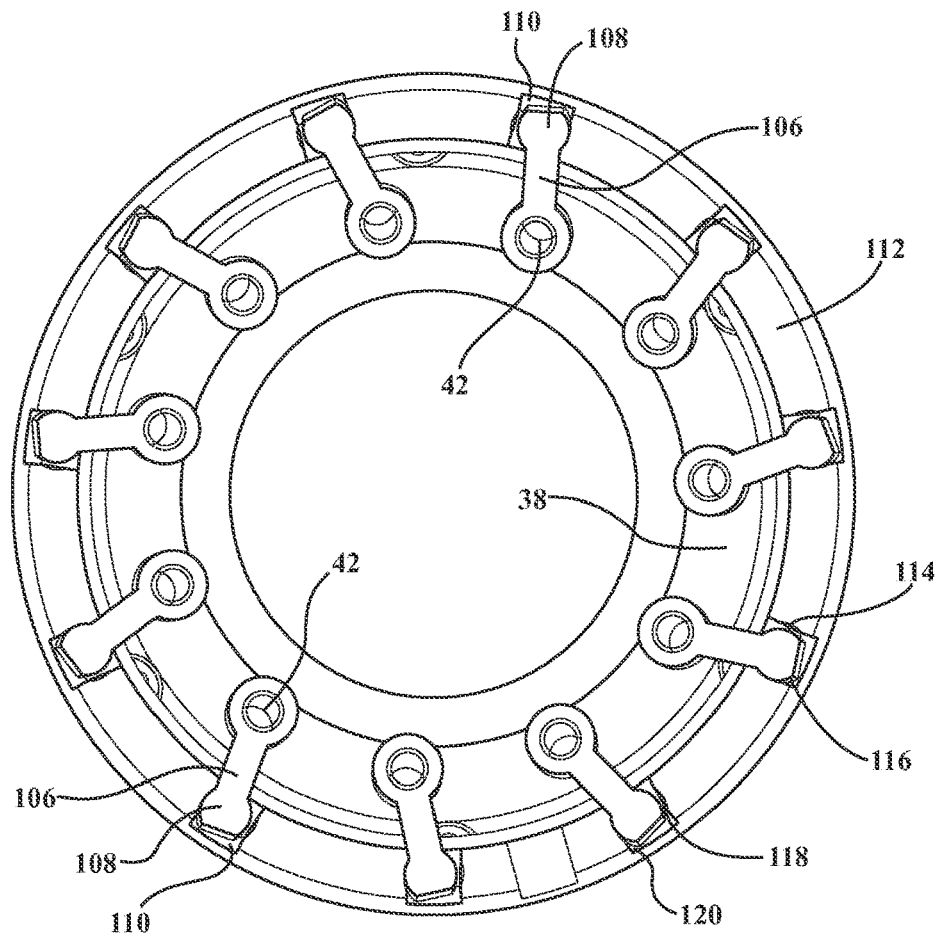
FIG. 19 is a plan view of the control ring rotated in a second direction.
Figure 20:
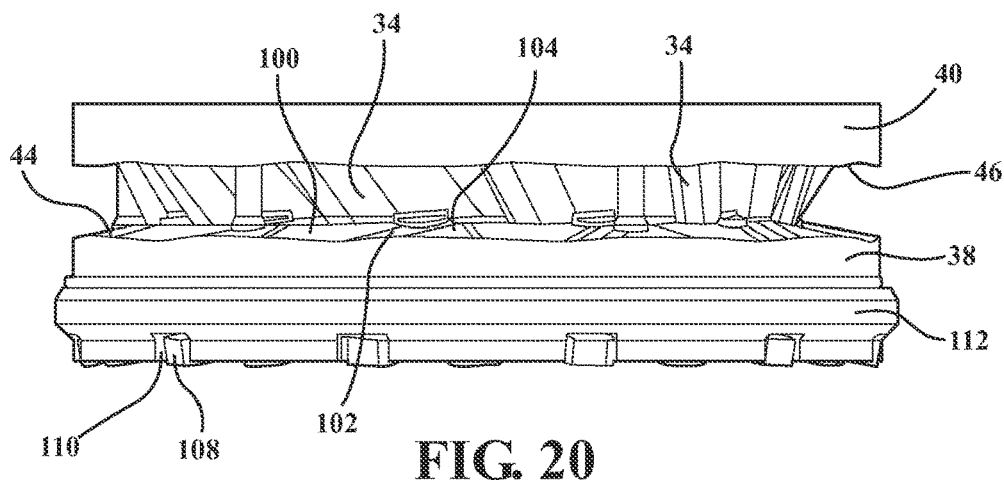
FIG. 20 is a side view of the guide apparatus and control ring rotated in the second direction.

Referring to FIGS. 15 and 16, a starting position of the control ring 112 is shown and the lever heads 108 are generally centered relative to the slots 110. With the control ring in the starting position, there is a slight gap between the side surfaces 114, 116 of the lever heads 108 and the flanks 118, 120 of the slots 110 as is common with a conventional VTG cartridge. The starting position of the control ring 112 corresponds with the guide vanes 34 being in a zero position, generally halfway between the open and closed positions. As the control ring 112 is rotated in a first direction (clockwise when viewed from FIGS. 15 to 17) to adjust the guide vanes 34 to the open position, the flanks 118 on one side of the slots 110 contact the corresponding side surfaces 114 of the lever heads 108 and urge the levers 106 to rotate. At the same time, the lever heads 108 move axially relative to the slots 110 in a direction generally out of the slots 110, as shown from FIGS. 16 to 18. Similarly, as the control ring 112 is rotated in a second direction (counterclockwise when viewed from FIGS. 15 to 19) to adjust the guide vanes 34 to the closed position, the flanks 120 on the other side of the slots 110 contact the corresponding side surfaces 116 of the lever heads 108 and urge the levers 106 to rotate. At the same time, the lever heads 108 move axially relative to the slots 110 in a direction generally out of the slots 110, as shown from FIGS. 16 to 20.

The side surfaces 114, 116 of the lever heads 108 may be rounded or curved, as shown in the Figures, to achieve the previously mentioned line of contact between the lever heads 108 and the flanks 118, 120 of the slots 110. It is contemplated that the side surfaces 114, 116 of the lever heads 108 may be suitably beveled. The flanks 118, 120 of the slots 110 may have a concave surface, as shown in the Figures, which corresponds with the side surfaces 114, 116 of the lever heads 108 as the guide vanes 34 are adjusted between the open and closed positions. It is contemplated that the flanks 118, 120 of the slots 110 may be flat.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A mixed-flow turbocharger (10) including variable turbine geometry, said mixed-flow turbocharger (10) comprising:
    a turbine wheel (24) having a turbine axis of rotation (R1) extending in an axial direction;
    a plurality of guide vanes (34) selectively movable between a range of angular positions, wherein each one of said plurality of guide vanes (34) pivots about a guide vane axis of rotation (R2) that is non-parallel to said turbine axis of rotation (R1),
    a control ring (62) having a control ring axis of rotation (R3) coaxial with said turbine axis of rotation (R1),
    wherein a pivot shaft (42) extends through each guide vane (34) along the guide vane axis of rotation (R2),
    wherein each guide vane is formed from a leading vane part which extends from the pivot shaft (42) towards a vane leading edge (70) and a trailing edge vane part which extends from a the pivot shaft (42) towards a vane trailing edge (72),
    wherein a vane lever or vane fork (52) is fixedly secured to a distal end (54) of each pivot shaft (42) away from the guide vane (34), and wherein each guide vane is driven to pivot via pivoting of said vane lever or vane fork (52), and
    wherein said vane lever or vane fork (52) is operatively coupled by sliding contact with said control ring (62) whereby rotation of said control ring (62) about said control ring axis of rotation (R3) causes said plurality of guide vanes (34) to pivot between said range of angular positions, and
    including a wheel inlet (28) having an upper inlet wall (44) and a lower inlet wall (46), wherein said upper inlet wall (44) includes a plurality of first planar sections (100) and said lower inlet wall (46) includes a plurality of first planar sections (100), wherein said plurality of first planar sections (100) of said upper inlet wall (44) and said plurality of first planar sections (100) of said lower inlet wall (46) define parallel boundary walls for said plurality of guide vanes (34).

2. The mixed-flow turbocharger (10) as set forth in claim 1 wherein said control ring (62) includes a plurality of actuator blocks (65), each one of said plurality of actuator blocks (65) extending in a direction parallel to said guide vane axis of rotation (R2) of a corresponding one of said plurality of guide vanes (34), and wherein each one of said plurality of guide vanes (34) includes a pivot shaft (42) having a vane fork (52) extending perpendicular to said guide vane axis of rotation (R2), said vane fork (52) having two guide arms (56) with a recess therebetween for receiving one of said plurality of actuator blocks (65) therein.

3. The mixed-flow turbocharger (10) as set forth in claim 1 wherein each one of said plurality of guide vanes (34) includes an upper edge (48) and a lower edge (50), said upper and lower edges (48, 50) extending between a leading edge (70) and a trailing edge (72), wherein said upper and lower edges (48, 50) are parallel with said plurality of first planar sections (100) of said upper and lower inlet walls (44, 46) from said leading edge (70) to said trailing edge (72) as said plurality of guide vanes (34) pivot between said range of angular positions.

4. The mixed-flow turbocharger (10) as set forth in claim 3 wherein for each one of said plurality of guide vanes (34) said upper inlet wall (44) includes a plurality of planar sections (100, 102, 104) having different angles of inclination and said lower inlet wall (46) includes a plurality of planar sections (100, 102, 104) having different angles of inclination.

5. A mixed-flow turbocharger (10) including variable turbine geometry, said mixed-flow turbocharger (10) comprising:
    a turbine wheel (24) having a turbine axis of rotation (R1) extending in an axial direction;
    a plurality of guide vanes (34) selectively movable between a range of angular positions, wherein each one of said plurality of guide vanes (34) pivots about a guide vane axis of rotation (R2) that is non-parallel to said turbine axis of rotation (R1), wherein a pivot shaft (42) extends through each guide vane (34) along the guide vane axis of rotation (R2), and wherein each guide vane is formed from a leading vane part which extends from the pivot shaft (42) towards a vane leading edge (70) and a trailing edge vane part which extends from the pivot shaft (42) towards a vane trailing edge (72), and
    a control ring (62) having a control ring axis of rotation (R3) coaxial with said turbine axis of rotation (R1), wherein rotation of said control ring (62) about said control ring axis of rotation (R3) causes said plurality of guide vanes (34) to pivot between said range of angular positions
    wherein said control ring (62) includes a plurality of actuator blocks (65), each one of said plurality of actuator blocks (65) extending parallel to said control ring axis of rotation (R3), and wherein each one of said plurality of guide vanes (34) includes a pivot shaft (42) having a vane fork (52) extending perpendicular to said guide vane axis of rotation (R2), said vane fork (52) having two guide arms (56) with a recess therebetween for receiving one of said plurality of actuator blocks (65) therein, wherein at least one guide arm (56) includes a convex curved surface for rolling contact with said received actuator block (65) as said plurality of guide vanes (34) pivot between said range of angular positions.

6. The mixed-flow turbocharger (10) as set forth in claim 5 including a wheel inlet (28) having an upper inlet wall (44) and a lower inlet wall (46), wherein said upper and lower inlet walls (44, 46) define complementary spherical surfaces having coincident spherical centers, and wherein said guide vane axis of rotation (R2) of each one of said plurality of guide vanes (34) extends through said coincident spherical centers of said upper and lower inlet walls (44, 46).

7. The mixed-flow turbocharger (10) as set forth in claim 6 wherein said upper inlet wall (44) has a convex spherical surface defining a first spherical center and said lower inlet wall (46) has a concave spherical surface defining a second spherical center coincident with said first spherical center.

8. The mixed-flow turbocharger (10) as set forth in claim 7 wherein each one of said plurality of guide vanes (34) includes an upper edge (48) complementary to said upper inlet wall (44) and a lower edge (50) complementary to said lower inlet wall (46), said upper and lower edges (48, 50) extending between a leading edge (70) and a trailing edge (72), wherein clearance between said upper and lower edges (48, 50) and said upper and lower inlet walls (44, 46) remains consistent from said leading edge (70) to said trailing edge (72) as said plurality of guide vanes (34) pivot between said range of angular positions.

9. The mixed-flow turbocharger (10) as set forth in claim 5 wherein a first guide arm (56) moves in said axial direction toward said control ring (62) and a second guide arm (56) moves in said axial direction away from said control ring (62) during actuation of said plurality of guide vanes (34) toward an open position, and wherein said first guide arm (56) moves in said axial direction away from said control ring (62) and said second guide arm (56) moves in said axial direction toward said control ring (62) during actuation of said plurality of guide vanes (34) toward a closed position.

10. A mixed-flow turbocharger (10) including variable turbine geometry, said mixed-flow turbocharger (10) comprising:

a turbine wheel (24) having a turbine axis of rotation (R1) extending in an axial direction;

a plurality of guide vanes (34) selectively movable between a range of angular positions, wherein each one of said plurality of guide vanes (34) pivots about a guide vane axis of rotation (R2) that is non-parallel to said turbine axis of rotation (R1), a control ring (62) having a control ring axis of rotation (R3) coaxial with said turbine axis of rotation (R1), a wheel inlet (28) having an upper inlet wall (44) and a lower inlet wall (46), wherein said upper inlet wall (44) includes a plurality of first planar sections (100) and said lower inlet wall (46) includes a plurality of first planar sections (100), wherein said plurality of first planar sections (100) of said upper inlet wall (44) and said plurality of first planar sections (100) of said lower inlet wall (46) define parallel boundary walls for said plurality of guide vanes (34), wherein a pivot shaft (42) extends through each guide vane (34) along the guide vane axis of rotation (R2), wherein each guide vane is formed from a leading vane part which extends from the pivot shaft (42) towards a vane leading edge (70) and a trailing edge vane part which extends from a pivot shaft (42) towards a vane trailing edge (72), wherein a vane lever or vane fork (52) is fixedly secured to a distal end (54) of each pivot shaft (42) away from the guide vane (34), and wherein each guide vane is driven to pivot via pivoting of said vane lever, wherein said vane lever is operatively coupled by sliding contact with said control ring (62) whereby rotation of said control ring (62) about said control ring axis of rotation (R3) causes said plurality of guide vanes (34) to pivot between said range of angular positions, wherein each one of said plurality of guide vanes (34) includes an upper edge (48) and a lower edge (50), said upper and lower edges (48, 50) extending between a leading edge (70) and a trailing edge (72), wherein said upper and lower edges (48, 50) are parallel with said plurality of first planar sections (100) of said upper and lower inlet walls (44, 46) from said leading edge (70) to said trailing edge (72) as said plurality of guide vanes (34) pivot between said range of angular positions, wherein for each one of said plurality of guide vanes (34) said upper inlet wall (44) includes a plurality of planar sections (100, 102, 104) having different angles of inclination and said lower inlet wall (46) includes a plurality of planar sections (100, 102, 104) having different angles of inclination, and wherein said control ring (112) includes a plurality of slots (110), and wherein each one of said plurality of guide vanes (34) includes a pivot shaft (42) having a lever (106) extending perpendicular to said guide vane axis of rotation (R2), said lever (106) disposed in one of said plurality of slots (110).

* * * * *